US012810697B2

(12) United States Patent
Gupta et al.

(10) Patent No.: US 12,810,697 B2
(45) Date of Patent: *Nov. 24, 2026

(54) SKILL-BASED WAGERING METHODS, DEVICES AND SYSTEMS WITH PLAYER VALIDATION

(71) Applicant: Super Money Games, Inc., Las Vegas, NV (US)

(72) Inventors: Sameer Mohan Gupta, Los Angeles, CA (US); Bryan O'Reilly, Las Vegas, NV (US); Ofir Ventura, Las Vegas, NV (US); Seth Schorr, Las Vegas, NV (US); Andrew M Costello, Las Vegas, NV (US)

(73) Assignee: Super Money Games, Inc., Las Vegas, NV (US)

( * ) Notice: Subject to any disclaimer, the term of this patent is extended or adjusted under 35 U.S.C. 154(b) by 922 days.

This patent is subject to a terminal disclaimer.

(21) Appl. No.: 17/985,035

(22) Filed: Nov. 10, 2022

(65) Prior Publication Data

US 2023/0074999 A1 Mar. 9, 2023

Related U.S. Application Data

(63) Continuation-in-part of application No. 17/354,118, filed on Jun. 22, 2021, now Pat. No. 11,620,877,
(Continued)

(51) Int. Cl.
*G07F 17/32* (2006.01)

(52) U.S. Cl.
CPC ...... *G07F 17/3295* (2013.01); *G07F 17/3223* (2013.01); *G07F 17/3239* (2013.01)

(58) Field of Classification Search
CPC ............ G07F 17/3295; G07F 17/3223; G07F 17/3239; G07F 17/3225; G07F 17/3237; G07F 17/3244; G07F 17/326
See application file for complete search history.

(56) References Cited

U.S. PATENT DOCUMENTS 2,223,255 A 11/1940 Koci
3,153,538 A 10/1964 Rogers
(Continued)

OTHER PUBLICATIONS

Carter et al. "Player Identity Dissonance and Voice Interaction in Games." Proceedings of the 2015 Annual Symposium on Computer-Human Interaction in Play. 2015. Oct. 5, 2015. Retrieved on Feb. 25, 2022 from <https://dl.acm.org/doi/abs/10.1145/2793107.2793144>. 6 pages.
(Continued)

*Primary Examiner* — Charles N Appiah
*Assistant Examiner* — Frank E Donado
(74) *Attorney, Agent, or Firm* — Snell & Wilmer LLP

(57) ABSTRACT

Embodiments of the invention comprise skill-based wagering games, systems and devices. In one embodiment of the invention, the configuration of a skill-based game is dependent upon the skill level of the player or players. In one embodiment, the game is configured so that the odds of winning the game, and thus the payout for a winning outcome, depends upon the player's skill level. In other embodiments, the payouts or awards offered to players are fixed and the difficultly level for achieving a winning outcome is adjusted based upon the skill levels of the players.

9 Claims, 7 Drawing Sheets

Related U.S. Application Data which is a continuation-in-part of application No. 17/136,396, filed on Dec. 29, 2020, now Pat. No. 11,430,303, which is a continuation-in-part of application No. 16/947,037, filed on Jul. 15, 2020, now Pat. No. 11,250,673, which is a continuation of application No. 16/293,947, filed on Mar. 6, 2019, now Pat. No. 10,720,026, which is a continuation of application No. 15/983,424, filed on May 18, 2018, now Pat. No. 10,262,503.

(60) Provisional application No. 62/509,305, filed on May 22, 2017.

(56) References Cited

U.S. PATENT DOCUMENTS

| | | | | |
|---|---|---|---|---|
| 4,754,967 | A | 7/1988 | Edler et al. | |
| 4,787,633 | A | 11/1988 | Fritzmeier | |
| 4,787,634 | A | 11/1988 | Gautraud | |
| 4,856,787 | A | 8/1989 | Itkis | |
| 4,930,775 | A | 6/1990 | Hoffman | |
| 6,017,278 | A | 1/2000 | Benko | |
| 6,050,895 | A | 4/2000 | Luciano, Jr. et al. | |
| 8,864,572 | B2 | 10/2014 | Oberberger | |
| 9,251,567 | B1 | 2/2016 | Armone et al. | |
| 9,251,666 | B2 | 2/2016 | Oberberger | |
| 9,418,521 | B1 | 8/2016 | Henrick | |
| 10,055,941 | B2 | 8/2018 | Luciano, Jr. et al. | |
| 10,262,503 | B2 | 4/2019 | Gupta et al. | |
| 10,720,026 | B2 | 7/2020 | Gupta et al. | |
| 2002/0068633 | A1 | 6/2002 | Schlaifer | |
| 2004/0242299 | A9* | 12/2004 | Walker | G07F 17/3276 463/16 |
| 2008/0064467 | A1 | 3/2008 | Reiner | |
| 2008/0153570 | A1* | 6/2008 | Esses | G07F 17/3244 463/20 |
| 2009/0023492 | A1 | 1/2009 | Erfanian | |
| 2009/0131174 | A1 | 5/2009 | Hutchinson-Kay et al. | |
| 2009/0227313 | A1 | 9/2009 | Minka et al. | |
| 2010/0022289 | A1 | 1/2010 | Menicou | |
| 2013/0084930 | A1 | 4/2013 | Chang et al. | |
| 2013/0273990 | A1 | 10/2013 | Oberberger | |
| 2014/0187304 | A1 | 7/2014 | Malek | |
| 2014/0302898 | A1* | 10/2014 | Vann | G07F 17/326 463/2 |
| 2014/0370958 | A1 | 12/2014 | Lutnick | |
| 2016/0358425 | A1* | 12/2016 | Luciano | G07F 17/326 |
| 2017/0084124 | A1 | 3/2017 | Brunet de Courssou | |
| 2017/0100872 | A1 | 4/2017 | Basallo | |
| 2017/0124812 | A1 | 5/2017 | Washington et al. | |
| 2017/0148271 | A1* | 5/2017 | Graboyes Goldman | G07F 17/3223 |
| 2018/0075707 | A1* | 3/2018 | Hirai | G07F 17/3209 |
| 2018/0336765 | A1 | 11/2018 | Gupta et al. | |
| 2019/0151739 | A1 | 5/2019 | Belsky | |
| 2019/0172317 | A1* | 6/2019 | Thirumaleshwar | G07F 17/3213 |
| 2019/0197837 | A1 | 6/2019 | Gupta et al. | |
| 2020/0302732 | A9* | 9/2020 | Luciano, Jr. | A63F 13/211 |
| 2021/0035417 | A1 | 2/2021 | Gupta et al. | |
| 2021/0118267 | A1 | 4/2021 | Gupta et al. | |

OTHER PUBLICATIONS

PCT Search Report and Written Opinion for International Application No. PCT/US2021/065041, mailed Mar. 11, 2022, 13 pages.

Brunswick Bowling Center Products, Spark Immersive Bowling, www.brunswickbowling.com/uploads/document-library/Bowling-Center-Products-Fnllr.pdf, 93 pages, date unknown.

* cited by examiner

SKILL-BASED WAGERING METHODS, DEVICES AND SYSTEMS WITH PLAYER VALIDATION

RELATED APPLICATION DATA

This application is a continuation-in-part of U.S. application Ser. No. 17/354,118, filed Jun. 22, 2021, which is a continuation-in-part of U.S. application Ser. No. 17/136,396, filed Dec. 29, 2020, now U.S. Pat. No. 11,430,303, which is a continuation-in-part of U.S. application Ser. No. 16/947,037, filed Jul. 15, 2020, now U.S. Pat. No. 11,250,673, which is a continuation of U.S. application Ser. No. 16/293,947, filed Mar. 6, 2019, now U.S. Pat. No. 10,720,026, which is continuation of U.S. application Ser. No. 15/983,424, filed May 18, 2018, now U.S. Pat. No. 10,262,503, which claims priority to U.S. Provisional Application Ser. No. 62/509,305, filed May 22, 2017, the contents of said prior applications are incorporated by reference as if set forth in their entirety herein.

FIELD OF THE INVENTION

The present invention relates to skill based gaming, and particularly, wager-based gaming.

BACKGROUND OF THE INVENTION

A wide variety of wager-based or "gambling" games are known. These games have various rules and may be presented using a variety of equipment. For example, table games may be presented at a gaming table using equipment such as cards, dice, a roulette wheel or the like. Machine-based games may be presented via rotating reel slot machines, video slot machines, video poker machines and the like.

Gambling games are generally classified into two different types: (1) "chance" games—where the outcome of the game is primary dependent upon chance (even if some skill may be involved), and (2) "skill" games—where the outcome of the game is primarily dependent upon the skill of the player. In the United States, historically only wagering games of chance have been permitted. However, skill-type wagering gaming is a new focus.

There are significant problems confronted when trying to develop wager-based skill games. One problem is configuring the game so that the player has a reasonable opportunity to win their wager (and be awarded winnings), while at the same time offering some predictability of the game being profitable to the game operator.

In the case of "chance" type games, the player does not control the outcome of the event. Thus, the odds of a winning or losing outcome of the event can be more closely controlled to achieve these criteria. For example, in a slot-type game, the symbols on the slot reels and particular winning combinations of symbols then displayed by the slot reels can be carefully selected so that a random spinning of the reels results, on average, in a particular percentage of winning and losing outcomes. Generally, the game is designed so that the percentage of winning outcomes is sufficiently high—at least coupled with the payout for the winning outcomes, to make the game exciting to the player (a game may have a high frequency of winning outcome but then lower average payouts or might couple a lower frequency of winning outcomes with outcomes having higher payouts, in order to make the game exciting to the player).

The payouts for winning outcomes are selected so that, based upon the probabilities of winning and losing outcomes, the average player payback, e.g. the amount of wagers returned to players as winnings for winning outcomes, is less than 100%. In the case of a slot machine, the average payback may be selected to be in the range of 93%-97%. This means that the remaining 3%-7% of all wagers are lost and thus retained by the casino as winnings (often referred to as the house hold). In this scenario, each individual player is enticed to play the slot game because they perceive that they have a reasonable chance of receiving winnings. Yet, over the long term, there are a sufficient number of losing wagers that the house receives revenue associated with the offering of the game.

Video poker games are classified as games of chance, and yet they involve some skill by the player (in selecting cards to hold/discard, for example, from their initially dealt cards). However, winning poker hands can be chosen, along with their associated payout, so that even if a player plays with a perfect game strategy, the player return on wagers will average less than 100%, thus ensuring a house hold for the game operator.

Thus, one problem with skill-based wagering is how to design a skill-based game which offers wagering which is both attractive to the player and the house. In this regard, unlike games of chance, the probability of a player obtaining a winning outcome in a game of skill largely depends upon the player's skill (rather than chance). This has two implications. First, the house then faces different probabilities of winning based upon players having different skill levels. Second, the attractiveness of the game to the player varies depending upon the player's skill.

Other problems with skill based wagering is how to offer multi-player games, such as where players play events with friends or players play events against one another, particularly when the players may all have different skill levels.

What is needed are skill-based wagering games, systems and devices which offer individual players and/or groups of players the opportunity for attractive wager-activities having outcomes, and thus associated awards, which are primarily (if not solely) dependent upon the player's skill.

SUMMARY OF THE INVENTION

Embodiments of the invention comprise skill-based wagering games, systems and devices. In one embodiment of the invention, the configuration of a skill-based game is dependent upon the skill level of the player or players. In one embodiment, the game is configured so that the odds of winning the game, and thus the amount of the entry fee or wagers required to play the game, or the payout for a winning outcome, depends upon the player's skill level. For example, relative to a particular skilled-based event, a player with a high skill level is offered lower winnings for achieving a particular outcome as compared to a player of a low skill level who achieves that same outcome (or where the winnings paid to both players is the same but the entry fee or wager for the player with a high skill level is higher than the entry fee or wager which the player with the low skill level must pay). In other embodiments, the payouts or awards offered to players (and entry fees or wagers) are fixed and the difficultly level for achieving a winning outcome is adjusted based upon the skill levels of the players.

In additional embodiments of the invention, the principles of the invention as are applied to multi-player events, including player vs. player events and tournaments.

In one embodiment of the invention, real-time wagering games are presented to players, such as based upon a status of an event. As one example, a player of a golf event may be presented with a wagering game based upon a location of the player's ball on the golf course after one or more strikes of the ball.

As one aspect of the invention, a player's identity may be verified, such as at the time of each player's skill-based input. The verification may comprise the player identifying themselves as the participant in the game and then using one or more sensors to collect information, such as a photo of the player, at the time of each input. The collected information may be compared to stored information regarding the player, such as a stored image, to validate that the player who is providing the skill-based input is the player identified as the participant in the game.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise skill-based wagering games, systems and devices. In one embodiment of the invention, the configuration of a skill-based game is dependent upon the skill level of the player or players. In one embodiment, the game is configured so that the odds of winning the game, and thus the payout for a winning outcome, depends upon the player's skill level. For example, relative to a particular skilled-based event, a player with a high skill level is offered lower winnings for achieving a particular outcome as compared to a player of a low skill level who achieves that same outcome. In another embodiment, the payouts or awards offered to players are fixed and the difficultly level for achieving a winning outcome is adjusted based upon the skill levels of the players.

Basic Principles of Personalized Skill Based Games of the Invention

Figure 1:
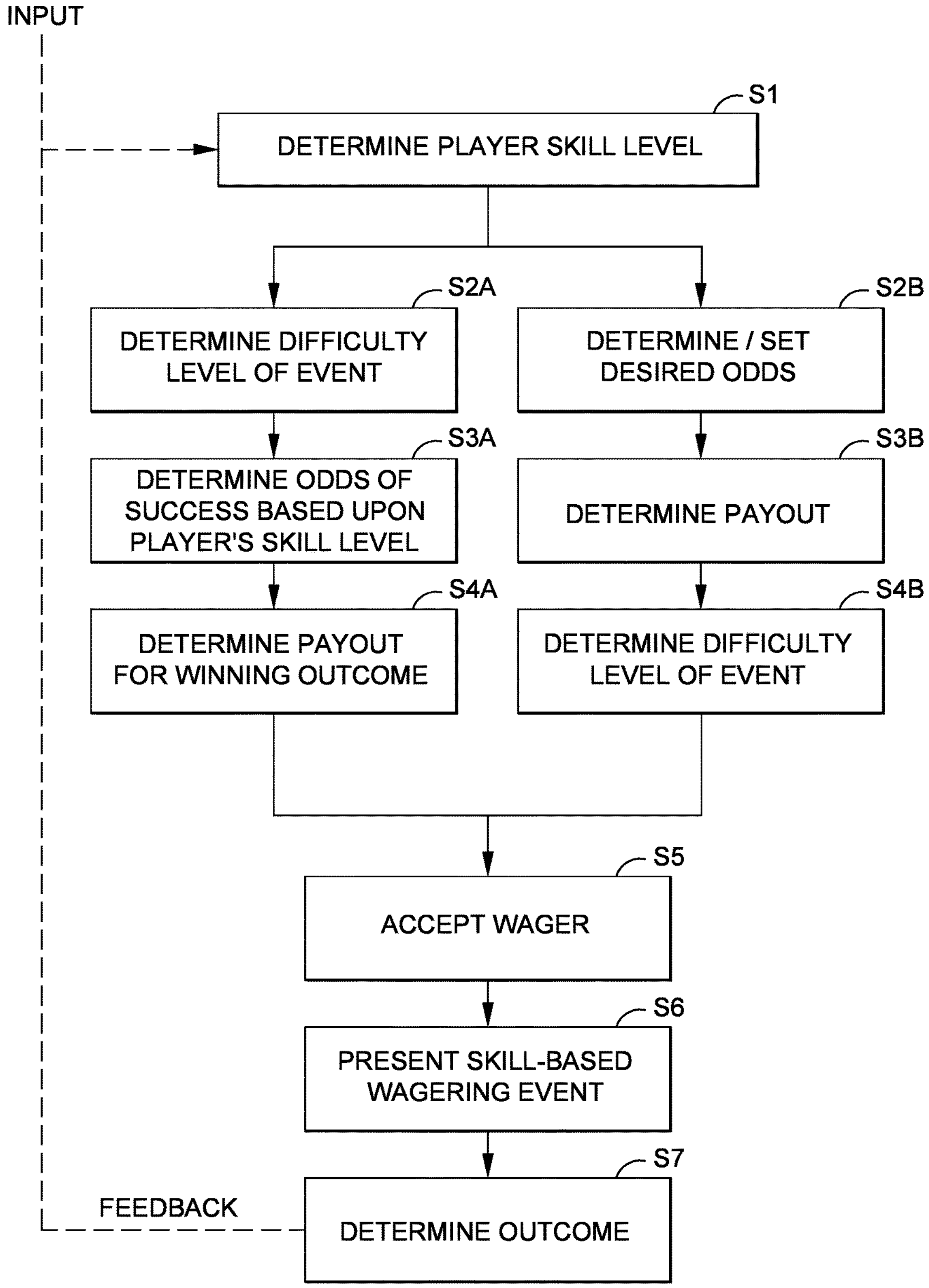
FIG. 1 is a flow diagram of a methodology of the present invention.

FIG. 1 illustrates one principle of operation of the invention. In a step S1, a player's skill level is determined. In one embodiment, as described below, the player's skill level is determined by input to one or more devices or via the use of one or more sensors. For example, as described in more detail below, relative to baseball batting-type wagering event, the player might attempt to hit a real or virtual baseball. The player's success in hitting the ball may be measured or determined. In other embodiments, the player might simply swing a bat and the swing might be analyzed, such as to determine bat speed, etc.

The player's skill level may be measured or determined relative to a presented wagering activity, or it could be determined generally. For example, although the skill-based wagering event might comprise a golfing event, the player's skill level might be estimated or measured by measuring a player's reaction speed to pressing illuminated buttons or the like.

The player's skill level may be represented in various manners. In one embodiment, the skill level might comprise a numerical value on a skill scale, such as on a scale of 1-100 where 1 is the lowest skill and 100 is the highest skill. However, the player's skill level might be correlated to a particular skill activity. For example, it might be determined in step S1 that a player drives a golf ball over 300 yards 9 out of 10 times on average. Thus, relative to a golf event where the goal is to drive a ball 300 yards, the player's skill level might be represented as a percentage, such as 90%.

In one preferred embodiment, an aspect of the invention comprises combining player data and/or statistics and then performing analytics on that information to create and update one or more player skill levels or ratings. Such a skill level or rating may comprise one or more general levels or ratings, and/or may comprise sub-task skill levels or ratings.

In one embodiment, the data or information that is used to generate a player skill level or rating may comprise various information such as:

(1) Event or activity "outcome" data, such as the outcome of one or more previous games or events and a current game or event, on an overall or sub-task basis (e.g., outcome as winning/losing; result achieved or not achieved, etc.)

(2) Event or activity related data, such as data relating to one or more previous games or events and a current game or event, on an overall or sub-task basis (e.g., where such data may depend upon the particular event, with non-limiting examples comprising club flight, ball flight, club speed, bat speed, ball speed, other sensory data like weight shifting, club used, ball used, day, time, etc., wherein the event or activity-related data preferably comprises non-outcome data).

As indicated above, skill challenges or tests may, in addition to actual skill-based wagering events, be used to create additional outcome information (#1) and/or event-related data points (#2), even when those challenges are not used for skill-based wagering payouts (e.g., as noted above, a player's skill level might be evaluated by testing a player's reaction time, success in a test event, etc., where that test or event is not a wagering event but is simply used to gain information regarding the player's skill level, either generally or in relation to a particular event or activity). In this regard, in a preferred embodiment of the invention, information is preferably collected from/regarding the player at all times in order to obtain as much data as possible regarding the skill level of the player. In one embodiment, data regarding the player might be obtained from external systems of sources, such as the Internet or specific systems. As one example, the system of the invention might search the name of a player on the Internet and locate information regarding the player's participation in one or more golf events and the outcome of those events (placing, score, etc.), which information may be used as part of the determination of the player's skill level. The system might also sync with external systems such as Strava, Zwift, Pacer, Map My Run, etc.

As one example, a golfer's performance may be measured every time they swing a club (either in a test event or actual performance during a wagering event). One or more of the following data may be collected: (1) Ball Path; (2) Swing Path; (3) Ball Type; (4) Club Type; (5) Ball Final Position; (6) Weight-Shifting; (7) Kinetic Body Movement; (8) Eye Tracking; (9) food consumed (such as tracked recent to the event); (10) Wager and Amount; (11) Sequence of Event (how many times has this player swung a club); and/or (12) Leverage of Action (what is the stress associated with this action), (13) Club head speed; (14) Attack Angle; (15) Swing Plane; (16) Dynamic Loft; (17) Spin loft; (18) Face angle; (19) Face to path; (20) Ball Speed; (21) Launch angle; (22) Launch direction; (23) Spin rate; (25) Smash factor; (26) Hang time; among others. Of course, a wide variety of sensors may be used to collect such information (mass/force sensing devices, optical trackers, etc.) and the types of information or data that are collected may vary depending upon the event.

In one embodiment, an algorithm is used to parse the collected data, such as using regression and predictive analytics to create and update over time an overall player skill level or rating, and in some embodiments, a player skill level or rating for a particular sub-task. For example, a player may have a general skill rating of 70. The player may also have a golf sub-rating of 90. Further, the player may have a bowling sub-rating of 55. As indicated herein, the player skill level(s) or rating(s) may be measured against past performance and used to create future games/events with varying difficulties and/or payouts.

The collected information may also be categorized by action type (as non-limiting examples: putt, approach shot with iron, chip, drive, etc.), such as for creating sub-ratings for the player for specific sub-tasks, or might also be used, such as via weighting, to create a general rating or skill level for the player (e.g. player has a skill rating of 70 for golfing generally, but 75 for putting and 60 for driving).

Similar methodologies may be used to determine skill levels for other tasks and/or sub-tasks, such as different sports including, but not limited to: bowling, baseball, cricket, football, hockey, soccer and any other game, as described herein.

As one example, in an embodiment of the invention, each measured value is compared to an average of all available data, the results or that data when compared to the outcomes, and the ideal variable to outcome, when available. For example, a user's golf swing path could be measured over time and compared to all golfers' swing paths to determine how close the user's golf swing path is to the swing path that results in the best outcomes. The closer the swing path is to the ideal, the higher the athlete metric or "skill level" is for that variable. This metric is adjusted after each action based on new data. The value of each action is weighted so that the more recent actions carry a higher weight than older data.

Regression analysis, multivariate analysis, other artificially intelligent analysis and other methods of calculation (including machine learning and deep learning) may be used to analyze the available data to optimize the player skill level.

In one embodiment, $X$=Action Data*Data Sequence*Variance from All Available Data*Variance from Ideal Metric, wherein:

Data Sequence=Order of Data Point, with the most recent data being higher valued (can be linear, geometric or other weight depending on the best fit regressive formula to the data)

Variable from All Available Data=Relative value of Athlete Data compared to all similar actions in the system Variable from Ideal Metric=Relative value of Athlete Data compared to the idealized or perfect action where available In one embodiment, a player's skill level calculation may comprise a weighted average of the player's metrics, wherein for each specific action, each player metric is compared to all player metrics in determining the importance of the metric to the overall player skill level calculation. For example, the user's relative golf swing path may be 3× as important as their relative weight-shifting when determining the result of the action. A summation of all the weighted averages of the athlete metrics is used to create the player's skill level calculation. The player skill level calculation is relative to each action, so the weighted average of player metrics may be different for a user swinging an iron or a driver, putting a ball or bowling a ball.

In this configuration, a player's skill level calculation is determined by the formula:

$$W = \frac{\sum_{i=1}^{n} \omega_i x_i}{\sum_{i=1}^{n} \omega_i}$$

W=weighted average

η=number of terms to be averaged $\omega_i$=weights applied to x values $X_1$=data values to be averaged In one embodiment, a "Possible Future Outcome" comprises a list of results from the action with overall percentages of success for each action.

Regression analysis, multivariate analysis, other artificially intelligent analysis and other methods of calculation may be used to analyze the available data to optimize the player skill level determination/calculation.

For example, in golf for an event which is hitting a ball to a hole 100 yards away, the results include but are not limited to:

Hole-in-One=0.008%

Landing a Ball on the Green=25%

Final Ball Position within 3 feet of the hole=1%

Final Ball Position within 5 feet of the hole=2%

Final Ball Position within 10 feet of the hole=5%

Final Ball Position within 20 feet of the hole=15%

For bowling, the result of the first ball in a frame can be:

Strike=5%

Gutter Ball=5%

1 pin down, with remaining pins in various configurations=2%

2 pins down, with remaining pins in various configurations=2%

3 pins down, with remaining pins in various configurations=3%

4 pins down, with remaining pins in various configurations=3%

5 pins down, with remaining pins in various configurations=5%

6 pins down, with remaining pins in various configurations=5%

7 pins down, with remaining pins in various configurations=15%

8 pins down, with remaining pins in various configurations=25%

9 pins down, with remaining pins in various configurations=30%

In one embodiment of the invention, an Outcome Likelihood Determination combines the player skill level determination/calculation to each Possible Future Outcome to create a "Percentage Change of each Future Outcome" for the player, wherein:

Outcome Likelihood=Athlete Skill Calculation for the Action*Possible Future Outcome As one simplistic example for golf, to have a ball end up 20 feet from the hole for a user on a 100 yard shot to the hole, a player's skill level calculation may be 2.5 times the Possible Future Outcome (Final Ball Position 3 feet on a 100 yard shot)=2.5×15%=37.5%

The calculation of the Outcome Likelihood may use other mathematical models to adjust the Possible Future Outcomes using the player skill level, including but not limited to linear, geometric, rating systems and other methods wherein the result is optimized to the data and the result is never greater than 100%.

In a step S2A, a difficulty level for obtaining a winning outcome of the event is determined. In one embodiment, as detailed below, the difficulty level may be represented as a numerical scale value or might be represented in other manners. As one example, a skill-based gaming event might comprise a player attempting to putt a golf ball across a surface into a hole. If the distance to the hole is 3 feet, for example, the level might be 5, whereas if the distance to the hole is 6 feet, the level might be 7. Of course, the level of difficulty may encompass various factors, such as the event in question, weather, surfaces, equipment, etc.

In a step S3A, the odds for the player achieving a winning outcome of the skill-based event area determined based upon the player's skill level relative to the difficulty of the event. Most importantly, these odds are player-specific, in that they vary depending upon the particular skill level of the player at issue. In other words, if a Player A has a skill level of 10 and Player B has a skill level of 5, then as to the same event, Player A may be deemed to be twice as likely to achieve a winning outcome as Player B.

Of course, the odds or probabilities of success/failure (based upon the player's skill as referenced to the difficulty of achieving a winning outcome) may be determined in various manners. In one embodiment, the odds or probabilities may be determined, for example, via an algorithm, as noted above.

In a step S4A, a payout is determined for a winning outcome of the skill-based event as to the player. In one embodiment, the payout is determined based upon the determined odds. For example, if the determined odds are 100% that the player will achieve a winning outcome, then the player may be offered a payout of only their wager (or their wager less a rake, commission or vigorish to the house)—since offering the player more than their wager means that the house will have to payout winnings to a player and have no expectation of revenue/winnings.

In one embodiment, higher winnings may be offered to players who are determined to have lower odds of success. As another simplistic example, relative to a Player A who places a $100 wager and has a 75% chance of success, that player might be offered a payout of $125 (e.g. a return of their $100 wager and $25 in winnings) for a successful outcome. Player B who places a $100 wager and has a 50% chance of success might be offered a payout of $150 for a successful outcome.

As illustrated in FIG. 1, in a step S5, the player places their wager (which may also be referred to as an entry fee or by other terminology, such as a buy-in or the like) if they are amenable to the payout being offered to them (it is noted that the wager or entry fee could be placed before the above-reference steps or at other times; for example the player could place their wager or entry fee initially and then withdraw it if the offered payout is too low), and in a step S6, the player participates in the skill-based event (e.g. the event is presented, the player's input(s) is/are received and the outcome of the event is determined—which as noted below, may be implemented by one or more skill-based gaming devices or systems).

If the player is unsuccessful in the event, e.g. loses, the player preferably loses their wager or entry fee to the house. If the player is successful in the event, e.g. achieves a winning outcome, the player preferably wins their wager or entry fee and is paid the defined winnings.

In one embodiment, as illustrated in FIG. 1 and as described above, the outcome of the event is preferably used in a feedback loop as part of further determining the player's skill level (such as for future events). In other words, the player's skill level may be assessed and then updated or modified over time, such as based at least in part upon the player's participation in one or more skill-based wagering events.

In the above-described configuration, different odds and then different payouts are determined and offered to players of different skill levels as to the same skill-based event. In some embodiments, the different odds may be used to determine a different payout in terms winnings paid based upon the same wager or entry fee, or in the form of a different wager or entry fee in relation to the winnings paid. For example, in the examples described above, Player A and Player B placed the same entry fee or wager of $100, and then the different odds of the players achieving a winning outcome resulted in a determination of an award of winnings of $125 to Player A for a winning result and an award of winnings of $150 to Player B for a winning result. This may be expressed or implemented in the form of different entry fees or wagers. For example, in the same example, each player might be awarded $100 for a winning result of the event. However, Player A would be required to place an entry fee or wager of $75 and Player B would be required to place an entry fee or wager of only $50 for the same chance to win $100.

In another embodiment, the same odds and payouts are offered to players of different skill levels, but the difficultly level of the skill-based event is determined based upon, and varies based on, a player's skill level to achieve the desired odds and payouts.

In this configuration, referring to FIG. 1 again, in step S1 each player's skill level is again determined. In a step S2B, desired odds are set or determined. This may be accomplished in various manners, such as by having the player select desired odds (or payouts, as described next) or by having the house select such.

In a step S3B, the payout for a winning outcome of the event is determined or set relative to the odds.

In a step S4B, the difficulty of the skill-based event is then determined or set. The difficulty is selected in order to obtain a desired likelihood of the player successively completing the task/event, when considering the player's skill level. As one example, the selected odds (e.g. the probability that the player will successfully complete the task) may be 50%. Relative to skill-based event in which players putt a golf ball into a hole, Player A might have a skill level of 10 and Player B might have a skill level of 5. Thus, the skill-based event presented to Player A might be one where Player A is required to putt a golf ball into a hole which his 20 feet away (where it is determined that based upon Player A's skill, Player A has a 50-50% chance or likelihood of putting the ball into the hole from 20 feet) and Player B is required to putt a golf ball into a hole which is only 10 feet away (where it is determined that based upon Player B's skill, Player B has the same 50-50% chance of success). In this manner, players of different skill levels can be offered the same odds and thus the same payouts (rather than, for example, different winnings for the same event as described above).

The remaining steps of this embodiment are otherwise the same as those described above.

As one example of correlating the player's likelihood of obtaining a successful event outcome and a payout for a winning outcome, a Player Rating might comprise a value from 1 to 100 and be derived from (as described in more detail herein) player demographic information, a player social graph, a player's past gameplay and a player's performance under similar circumstances (e.g. analogous event performance). Then a Player Multiple (which may be used as a Player Payout Multiple or Player Difficulty Multiple) may be generated, where the Player Multiple may comprise a value of 100/Player Rating. Thus, the Player Multiple comprises a value between 1 and 100 and is inversely related to the Player Rating.

In an embodiment where players participate in the same event, the Player Multiple defines different payouts for players of different skill levels. For example, a player having a Player Rating of 75 (of 100) could be paid a payout multiple of 1.3 times their wager or entry fee for a winning outcome of the event, whereas a less skilled player having a Player Rating of 50 (of 100) could be paid a payout multiple of 2 times their wager or entry fee for the same winning outcome. In other words, when it is calculated that a player has a higher likelihood of obtaining a winning outcome for the event, the payout will be lower than when the player has a lower likelihood of obtaining a winning outcome for the event.

Likewise, the Player Multiple may define the difficulty of the event when the payout for a winning outcome is the same. For example, the payout on a $10 wager or entry fee might be set at $20 for an event having a base difficulty level of 10. Then the player with a Player Multiple of 2 would be presented with an event which is 2 times easier (or some scaled value) of the base level, while the player with the Player Multiple of 1.3 would be presented with an event which is only 1.3 times easier than the base difficulty (e.g. the player with the higher rating is presented with a harder event than the player with the lower rating).

The player skill level, Player Rating and Player Multiple are preferably determined by one or more computing devices (such as a game server as detailed below), such as based upon information stored in one or more databases and/or obtained from one or more remote devices such as sensors. The calculated Player Rating and Player Multiple may be used to generate one or more outputs, such as an output from a game server to a gaming device which causes the device to vary the difficulty level of the event or the vary the odds/payouts to the player.

In this configuration, the difficulty level of the event for each player is selected based upon the odds of the player receiving a winning game outcome, where a winning payout may then be the same for each player. As with the example described above, the winning payout is in relation to a wager or entry fee. Thus, in one example, each player pays the same entry fee or wager to enter the game and the payouts are the same as a result of variability of the difficulty level of the event for each player. In other embodiments, the payouts could vary corresponding to different entry fees or wagers, without deviating from this principle. For example, Player A may have a skill level which his twice that of Player B. The difficulty of the event may be set to be twice as difficult for Player A than Player B. Player A might place a wager or entry fee of $50 and be awarded $100 for a winning outcome and Player B might place a wager or entry fee of $100 and be awarded $200 for a winning outcome. In this example it will be seen that the payouts are different, but they are both two times the player's entry fee or wager, so that they are effectively made at the same rate for both players and the only variable factor is the change in difficulty of the event between the two players.

Figure 6:
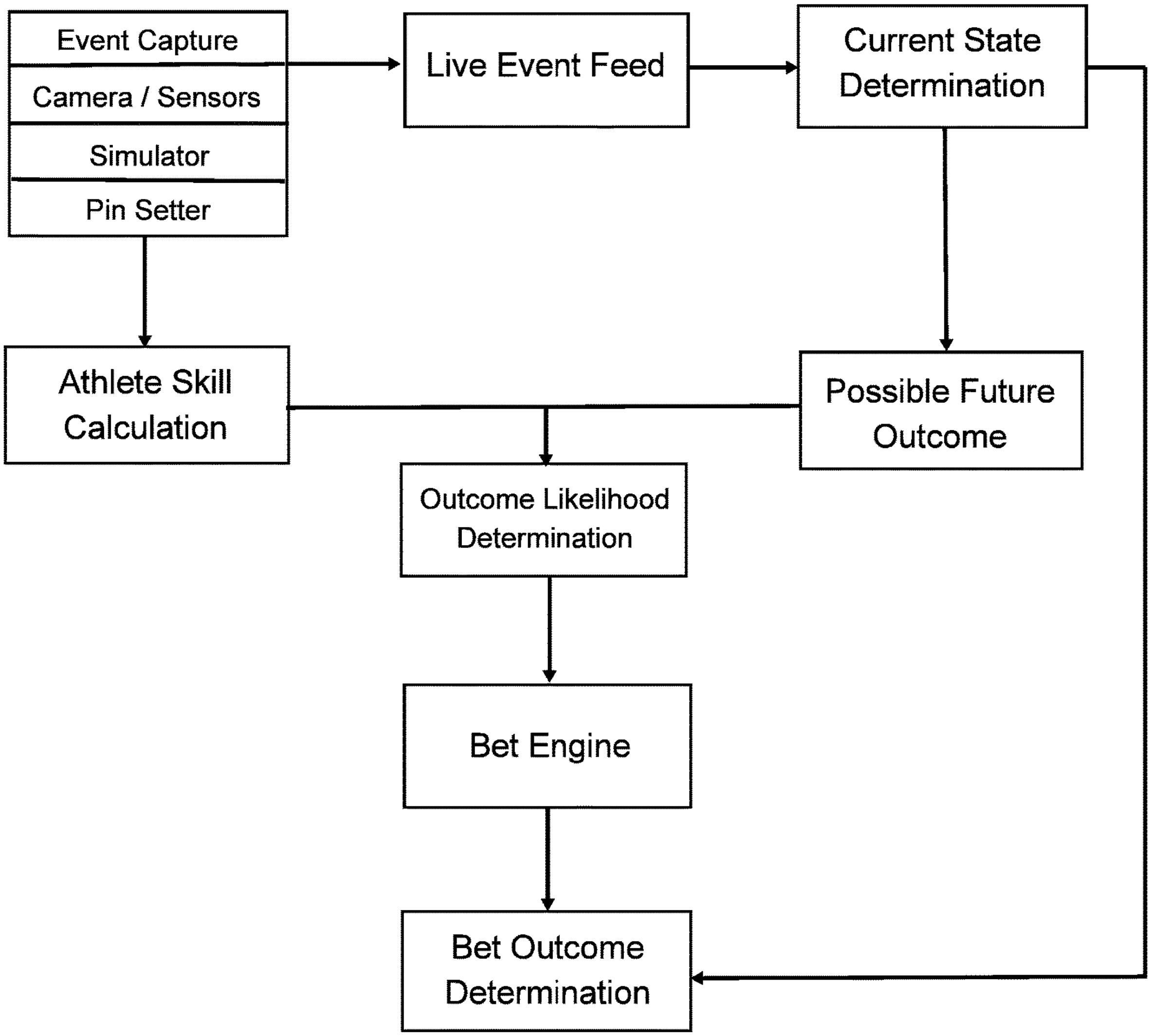
FIG. 6 illustrates a flow diagram relating to a game engine of the invention.

FIG. 6 illustrates one embodiment of a game engine (such as implemented by a game server of a system of the invention) and flow of information relative to the game engine relative to the invention. As illustrated, and as described in greater detail above, the game engine may calculate or determine an "Outcome Likelihood", such as from a player skill calculation and from a possible future outcome determination, where the player skill calculation is based, at least in part, upon information about the player's performance in an existing event (or test event), such as determined from event capture devices or sensors (a pinsetter that determines pins knocked down in bowing, cameras or other sensors that capture knocked down pins in bowling, the player's swing, ball path etc., in golf, etc., and wherein the possible future outcome is based upon event feed information and a current state determination. The game engine utilizes the "Outcome Likelihood Determination", such as via a betting engine portion of the game engine, to generate event information (payouts, event difficulty, etc.) for use in presenting the event, and determines the outcome of the wagering event based upon the player's performance (which is then used, as noted herein, to determine an updated player skill level).

The above is just one method and system for determining or calculating a player skill level and it will be appreciated that other methods and systems might be utilized.

Devices and Systems

The invention as described above may be implemented in various manners. In one preferred embodiment, the invention is machine-implemented or partially machine-implemented.

Figure 2A:
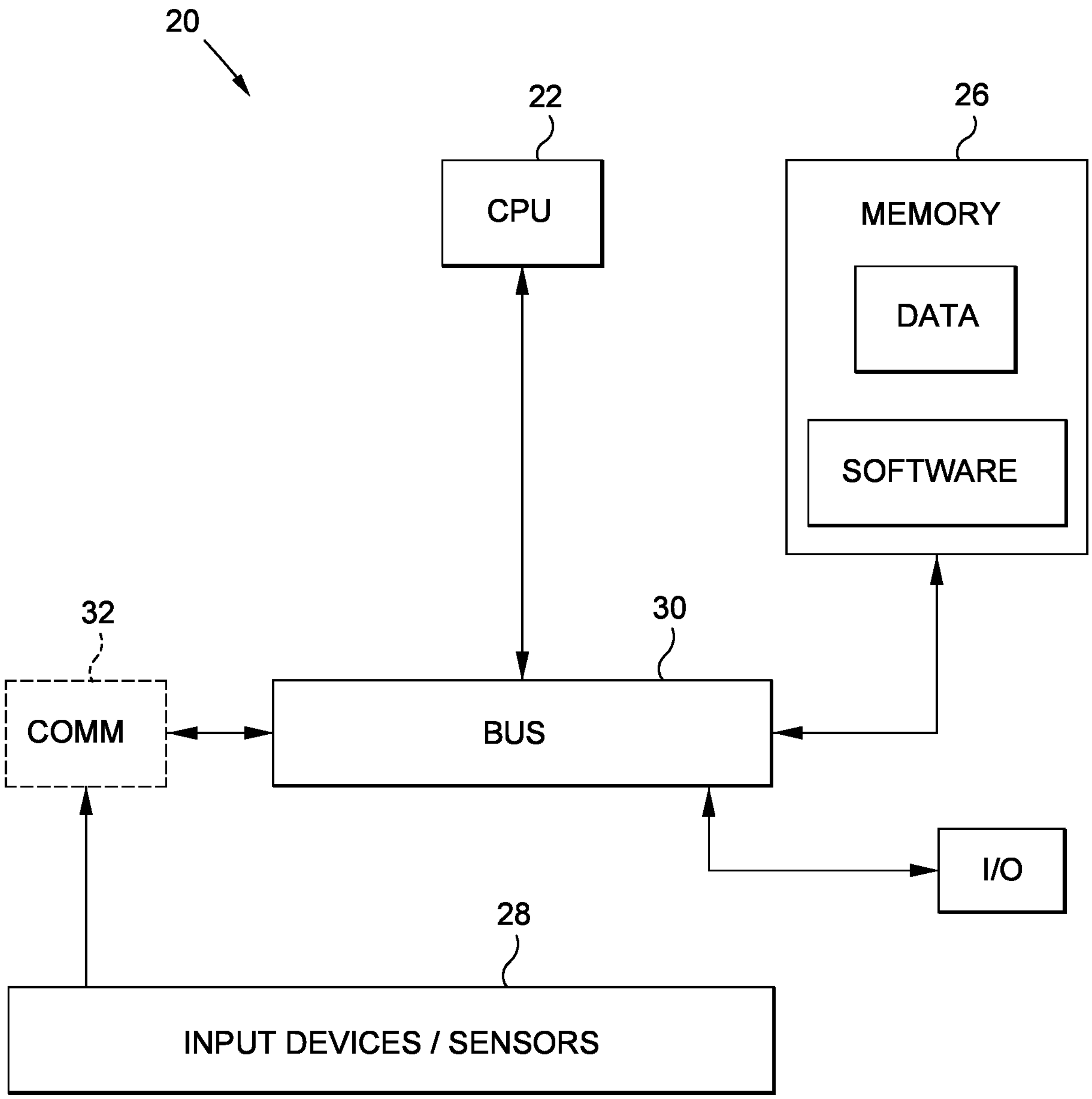
FIGS. 2A and 2B schematically illustrates devices and systems in accordance with the present invention.

FIG. 2A conceptually illustrates one embodiment of a specially made or configured skill-based gaming device in accordance with the present invention. In general, the device 20 comprises at least one processor or CPU 22, one or more memory or data storage devices 26, and one or more communication interfaces 28. In one embodiment, the processor 22 executes machine-readable code or software which is stored in the memory device 26.

As illustrated, the device 20 includes, or is configured to receive input from, one or more player input devices or sensors 28. In one embodiment, the input devices or sensors 28 are preferably utilized in determining a skill level of the player. The input devices 28 might directly receive input. For example, to judge a player's reaction speed, the input device 28 might comprise a button which lights up. The player may be required to depress the button as quickly as possible after it is illuminated, whereby the input to the button (the button press) receives direct input. In other embodiments, one or more sensors might be used to obtain or gather information about a player's actions. For example, a player might be required to swing a golf club to hit a golf ball. One or more sensors might be used to sense the speed and/or path of the swing of the club and/or the speed/path of the golf ball.

In one embodiment, output or signals from the input devices or sensors 28 are provided to the CPU 22 for processing and/or might be provided to the one or more data storage devices 26 for storage. In another embodiment, the output or signals from the input devices or sensors 28 might be provided to one or more external processors or devices for pre-processing and then be provided to the CPU 22 and/or one or more data storage devices 26.

In one embodiment, the various components of the device 20 might be configured to communicate over one or more communication buses 30. The input devices or sensors 28 might be configured to communicate with the system bus 30 via one or more communication interfaces or ports. For example, the input devices or sensors 28 might be configured as USB devices, or might be configured as Internet devices and provide data in the form of TCP/IP packets.

In one embodiment, the device 20 may include one or more I/O devices. These might comprise, for example, a keyboard, mouse, video display or the like. These I/O devices may allow a user, such as an operator or a player, to interface with the device 20.

The one or more data storage devices 26 may store software which causes the CPU 22 to implement the functionality described above.

Of course, the device of the invention might have any number of configurations, including where elements of the device are distributed, such as by being associated with other devices or systems (distributed, etc.) or linked with other devices or systems.

Figure 3:
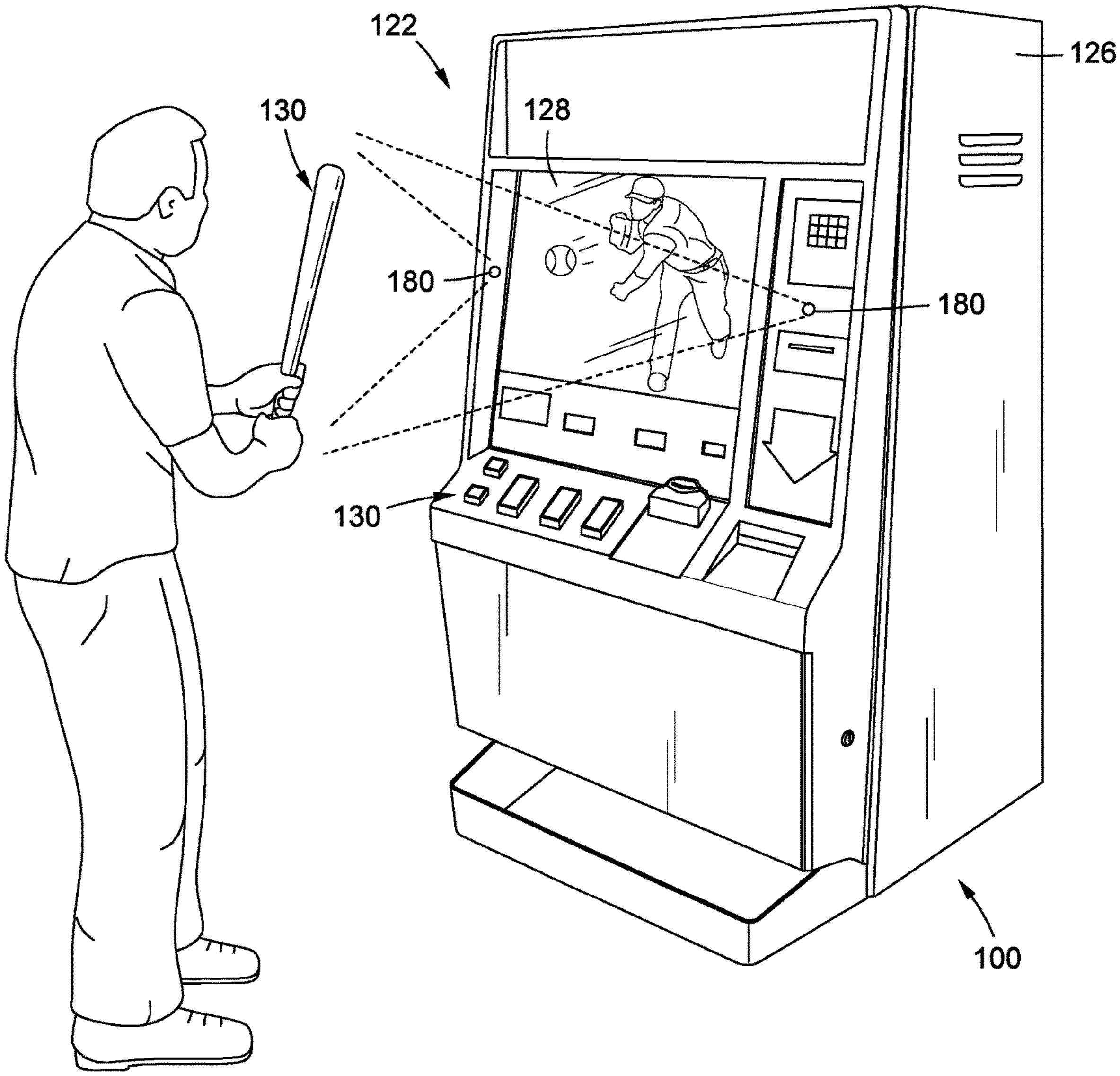
FIG. 3 illustrates a skill-based gaming device in accordance with one embodiment of the invention.

For example, FIG. 3 illustrates one embodiment of a device 100 of the invention configured as a special purpose or dedicated skill-based wagering/gaming machine or device 122. Because the device offers wagering, it may be located at a casino (and as such may be referred to as a "casino gaming device"), but it might be located in many other locations. Further, while the skill-based gaming device 122 might have a similar appearance to other wager-based gaming machines in a casino, as described herein, the skill-based gaming device 122 is substantially different from standard casino wagering machines such as video poker and slot machines, as described in detail herein.

As illustrated, the skill-based game device 122 may include a housing or cabinet 126 for supporting and/or enclosing various components required for operation of the device. In the embodiment illustrated, the housing 26 includes a door located at a front thereof, the door capable of being moved between an open position which allows access to the interior, and a closed position in which access to the interior is generally prevented. The configuration of the skill-based game device 122 may vary, such as by having different shapes, etc.

The skill-based game device 122 preferably includes at least one display device 28 configured to display the skill-based game or event information. The display device 128 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display 128 may be capable of projecting or displaying a wide variety of information, including images, symbols and other indicia or information associated with game play, game promotion or other events. The skill-based game device 122 might include more than one display device 128, such as two or more displays 128 which are associated with the housing 126.

As indicated herein, the skill-based game device 122 is preferably configured to present one or more games upon a player making a monetary payment or wager. In this regard, as described in more detail below, the skill-based game device 122 includes a mechanism or means for accepting monetary value.

As described above, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the skill-based game device 122 preferably includes a mechanism or means for returning unused monetary funds and/or dispensing winnings to a player.

The skill-based game device 122 preferably includes one or more player input devices 130 (such as input buttons, plunger mechanisms, a touch-screen display, joystick, touch-pad or the like). These one or more devices 130 may be utilized by the player to facilitate game play, such as by providing input or instruction to the skill-based game device 122. For example, such input devices 130 may be utilized by a player to place a wager, cause the skill-based game device 122 to initiate a game, to provide skill-based game input, to "cash out" of the device, or to provide various other inputs.

In one preferred embodiment, the skill-based game device 122 includes at least one microprocessor or controller for controlling the device, including receiving player input and sending output signals for controlling the various components or peripheral devices of the machine 122 (such as generating game information for display by the display 128). The controller may be arranged to receive information regarding funds provided by a player to the device, receive input such as a purchase/bet signal when a purchase/bet button is depressed, and receive other inputs from a player. The controller may be arranged to generate information regarding a game, such as generating game information for display by the at least one display 128, for determining winning or losing game outcomes and for displaying information regarding awards for winning game outcomes, among other things.

The controller may be configured to execute machine readable code or "software" or otherwise process information, such as obtained from a remote server. Software or other instructions may be stored at a memory or data storage device, e.g. in a fixed or non-transitory configuration. The memory may also store other information or data, such as data stored in table or other forms (including, but not limited to look-up tables, pay tables and other information, including tracked game play information).

Preferably, as described in more detail below, the controller is configured to execute machine readable code or instructions (e.g. software) which are configured to implement the game. In this regard, the device is specially configured to present the game of the invention via specific software and/or hardware which causes the device to operate uniquely. For example, the controller of the skill-based game device 122 may be configured to detect a wager, such as a signal from a player's depressing of a bet or game play button.

As indicated, the skill-based game device 122 is configured to present one or more wagering games. The skill-based game device 122 is preferably configured to accept value, such as in the form of coins, tokens, paper currency or other elements or devices representing value such as monetary funds (such as by accepting coins via a coin acceptor 32, bills or monetary-value tickets by a media reader/acceptor 134, etc.). Of course, in such event the skill-based game device 122 may further be configured with one or more paper currency or ticket storage devices, such as cash boxes, and other paper currency or media handling devices (including transport devices). The skill-based game device 122 might also be configured to read FOBs, magnetic stripe cards or other media having data associated therewith and via which value or funds may be associated with the skill-based game device 122. The mechanism for accepting monetary value might also comprise hardware and/or software which allows a player to transfer (such as electronically) funds from an account, such as a casino wagering account, or a bank or other financial institution account. Such a mechanism might include a communication interface which permits the device to communicate with a mobile phone, PDA, tablet or other electronic device of the player (such as via a physical interface or wired or wireless communications links, such as to enable the transfer of funds from the player to the device or system).

When the player associates funds with the device or an associated system, a credit balance is generated. The credit balance may comprise a plurality of monetary value credits. The player may wager some or all of the associated monetary value, such as by wagering one or more of the credits associated with the credit balance. In one embodiment, when the player's wager is received, the player's credit balance is reduced by the number of wagered credits. The player might then provide a separate input to begin the game. Of course, other configurations may be implemented for accepting monetary value from the player and for allowing the player to place a wager from the associated monetary value.

In one embodiment, the skill-based game device 122 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the skill-based game device 122 to indicate their desire to cash out, such as by selecting a "cash out" button or touch screen feature or providing other input. In response, a monetary value represented by the player's credit balance or the like is preferably paid, transferred or otherwise provided to the player. For example, upon an award or at cash-out, associated funds may be paid to the player by the skill-based game device 122 dispensing coins to a coin tray. In another embodiment, funds may be issued by dispensing paper currency or other media. In yet another embodiment, a player may be issued a media, such as a printed ticket, which ticket represents the value which was paid or cashed out of the machine. In yet another embodiment, the cash-out might result in the dispensing of a card or other media which stores or represents the cashed-out funds, such as by writing funds information to a magnetic stripe of a card which is inserted into a media writer of the device or dispensed from the machine. In other embodiments, the cash-out mechanism may result in the funds value being transferred to an external device or account, such as a player's casino account (such as associated with a casino server), a remote bank or other financial account, or an electronic device such as a player's phone, PDA or tablet.

In some embodiment, the skill-based game device 122 may also include a player tracking device, such as a card reader 166 and associated keypad 170. Such player tracking devices are well known and may permit the game operator to track play of players of the device. The tracked play may be utilized to offer player bonuses or awards.

Preferably, the skill-based game device 122 is configured to generate and present one or more skill-based games as described above. Thus, the one or more input devices 130 are preferably configured to receive a player's skill-based game input to the skill-based game device 122. As described herein, various types of input devices or sensors may be used to receive that input (for example, FIG. 3 illustrates a skill-based game device 122 which includes buttons and motion detection sensors, such as for detecting a player's swing of a baseball bat).

As indicated, the skill-based game device 122 preferably also includes unique/specific software for implementing the features of the invention as described herein. For example, the software may include one or more modules that are configured to assess a player's skill, calculate odds and payouts for one or more events, present the event to the player (such as when executed, causing the CPU to cause the display information regarding the skill-based gaming event), receive the player's input (in this example, the game may comprise the display of a virtually pitched baseball which the player attempts to hit by swinging a bat and where sensors 180 are used to register the player's swing, where the CPU then determines the outcome of the event and then, if winning awards winnings). As described below, in other embodiments, various features or aspects of the invention may be implemented by a remote server (such as the step of determining a player's skill level, payouts, event difficultly), etc., wherein the skill-based game device 122 then serves as a game interface for the player.

As described above, in one embodiment, the player's skill level is utilized relative to presentation of the skill-based game. Thus, the skill-based game device 122 may be configured to determine, track and/or store information regarding players and their skill levels. For example, a data file may be maintained in the memory of the skill-based game device 122, such as which includes a list of players and their skill levels. The skill-based game device 122 might identify the player in various fashions, such as by a player tracking card, biometric identification or other information or devices which are now known or later developed (a new player might be required to provide information to generate an account, etc.). A biometric or other method of confirming the player's identity is preferably used, such as to prevent a player of one skill level (such as a high skill level) from signing in as another player (such as a player of a low skill level).

Figure 4:
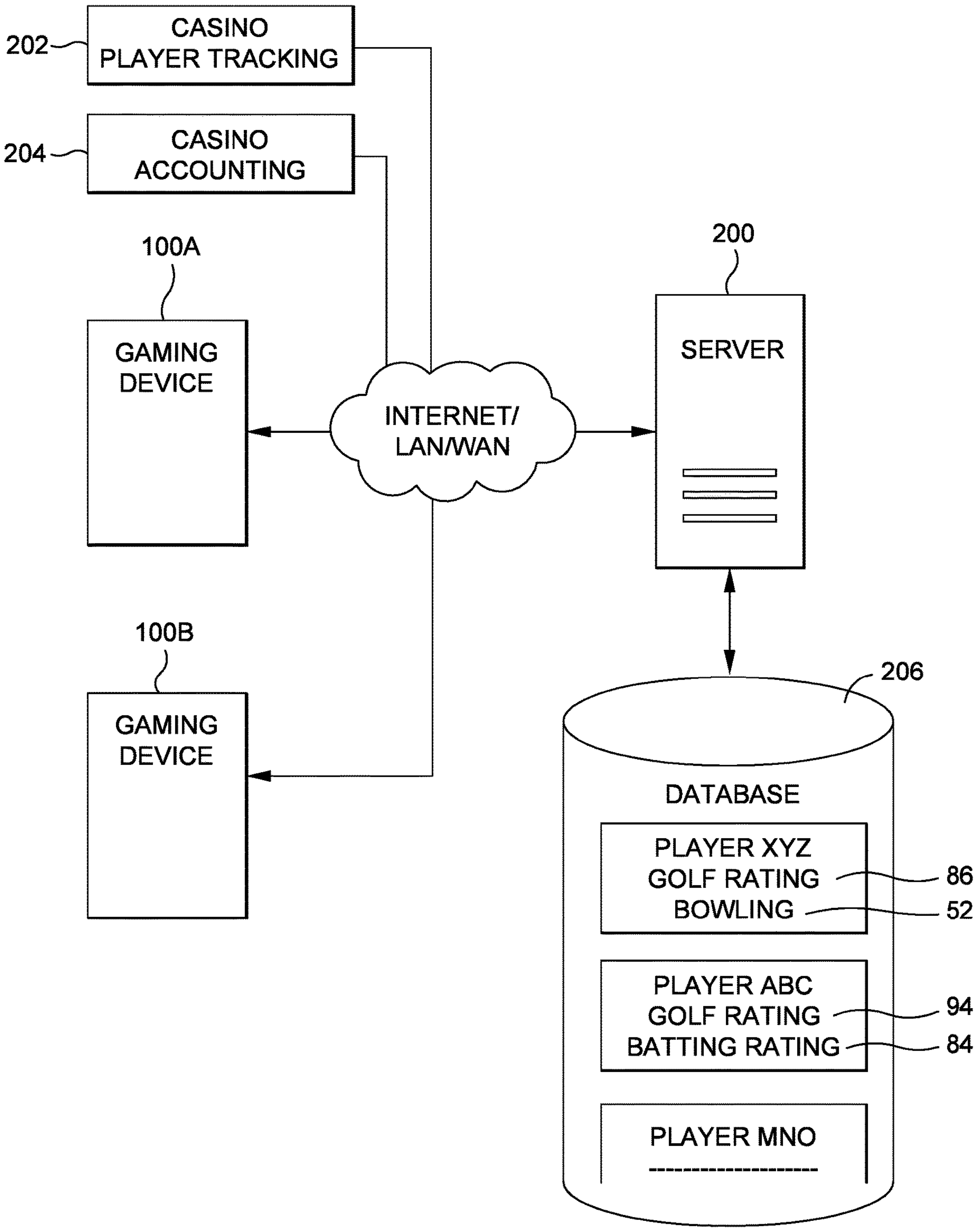
FIG. 4 illustrates one embodiment of a gaming system in accordance with the invention.

Of course, the skill-based game device 122 may be configured to generate and present games in a stand-alone manner or it may be in communication with one or more external devices at one or more times. For example, as illustrated in FIG. 4, the skill-based game device 122 may be configured as a server based device and obtain information from a remote game server 200 (in which event the device controller may receive game information from the server and use that server-generated information to present the game at the device).

For example, instead of comprising a dedicated purpose device, it is possible for the game of the invention to be presented on a computing device, including at a home or office computer or a player's mobile electronic device such as a PDA, phone or the like. In one embodiment, a player might log in to a game server and the controller of the game server may cause game information to be delivered to the player's computer via a communication link and then be displayed on a display of the player's computer. The communication link might comprise or include the Internet, a casino network such as a wired or wireless LAN, or combinations of public and/or private networks including wired and/or wireless links. In such a configuration, it will be noted that the term "controller" may comprise more than one device. For example, in a server-based environment, a controller at a server may generate game information and transmit that information to a local controller at a device or a player's computer or other electronic device. The local controller at the device or the player's computer or other electronic device may then cause game information to be displayed on one or more associated displays.

The skill-based game device 122 may, as noted above, be part of a system which includes other devices. For example, as illustrated in FIG. 4, in a casino environment, the skill-based game device 122 may communicate with one or more casino systems (such as over one or more networks such as the Internet, LANs, WANs, etc.), such as a player tracking server or system 202, an accounting system or server 204, a ticketing system, a bonusing system, a tournament system, other gaming machines, and external devices.

As one example, a player might sign up for a player rewards account and a casino funding account at the casino. The player might go to a device 100A to play a skill-based game and might select a particular event at the machine (such as "hit a 100 mph fastball"). The player might insert their player tracking card and PIN into the machine 122, which transmits that information to a player tracking system of the casino. This system identifies the player and notifies the skill-based game device 122, which in turn, notifies the server 200. The server 200 looks up the player and determines that they have skill level X. Either the server 200 or skill-based game device 122 might then determine the odds and payout for the "hit a 100 mph fastball" game based upon the player's skill level. The player might then place a wager on the event, either via credits or via accessing funds associated with their casino account or a remote bank account, etc. The skill-based game device 122 would then present the event, registering the input from the player as noted above. Information regarding the player's input and/or the outcome of the event might be transmitted back to the host server 200 for updating the player's skill level.

In one configuration, as illustrated in FIG. 4, a central database 206 of players and their skill levels may be maintained an updated (such as in a database associated with a central server), which database is utilized relative to a plurality of different gaming machines or devices.

In the embodiment just described, multiple skill-based gaming or presentation devices might be linked to one more servers or back end systems, such as which track players, player skill levels and the like, for the entire system of linked machines.

Of course, a gaming device or system may be configured in various fashions and be configured to present various skill-based gaming events (as described in more detail below). As one example, the skill-based gaming event might comprise a simulated golf event or activity and the device might comprise, at least in part, a sport or game simulation system such as described in PCT/US2015/055018, entitled SPORT AND GAME SIMULATION SYSTEMS WITH USER-SPECIFIC GUIDANCE AND TRAINING USING A DYNAMIC PLAYING SURFACE, the contents of which is incorporated herein by reference in its entirety as though set forth herein. Such a device might comprise the event presentation device of the invention, wherein the device is modified to include the features herein (e.g. determine and track player skill level, determine odds/payouts, receive wagers, etc.), and/or is linked to other devices or systems for implementing such features. For example, such a system may be used to present golf putting events where player putt a golf ball with a putter across the surface into a hole or at targets, where aspects of the playing surface may vary (such as by tilting it, where the hole location and/or distance can be varied, etc.) and where ending ball position, such as in the hole or hitting a target, or close to the hole/target, may result in a score.

It is noted that other configurations of devices and systems may be utilized to present skill-based games as used herein. For example, in one embodiment, a player might attempt to hit a ball which is pitched with a pitching machine. The pitching machine may be controlled by a processor or the like so as to set, for example, the speed or type of pitch, etc. The player might utilize a bat to try and hit the ball. Sensors associated with the bat, image sensors or the like might monitor the player's input to determine whether the player hit the ball, the output of which is provided back to the processor for determining the outcome of the event.

Additional Aspects of the Invention

Additional features and aspects of the invention will now be described.

First, the types of skill-based gaming events to which the present invention are applicable are limitless. As examples, and not by way of limitation, such might comprise baseball, basketball, football, soccer, golfing, driving/racing, bowling, Skee-ball, video/virtual games (Candy Crush Saga®, Asteroids®, etc.), billiards/pool, card games or other events now known or later developed, or aspects thereof (for example, relative to baseball, the event might comprise pitching to a target or hitting; relative to golf such might comprise putting or driving).

For example, principles of the invention may be applied to the game of bowling, such as to make bowling more interesting and/or to create entirely new games.

In one embodiment, the principles of the invention may be applied to a standard game of bowling—e.g. a standard 10 frame game played with a standard 10 pin configuration. As one example, a player's skill level might be utilized to set odds for a wager or entry fee, where the odds will vary based upon the player's skill level. As one example, a first player who has a high skill level (or high bowling sub-skill level) may be given odds of 2:1 that they will bowl a game of 250 or more, but a second player with a much lower skill level might be given odds of 10:1.

In one embodiment, the principles of the invention may be applied to non-standard bowling games, including to uniquely configured bowling events. For example, as indicated herein, the difficulty of an event may be modified, such as based upon a player's skill level, in relation to desired odds/payouts. As one example, a first player may have a high skill level or rating and second player may have a low skill level or rating. In relation to a desired set payout of 5:1, the difficultly level of the bowling event which is assigned to the first player may be much higher than that of a bowling event which is assigned to the second player. For example, the first player might be challenged with the task of picking up a 7-10 split, while the second player might be challenged with the task of picking up a 8-9-10 pin combination.

In this regard, one aspect of the invention comprises controlling a pinsetter of a bowling lane in order to create non-standard pin configurations, such as in relation to singular events or in a sequence of events.

Examples include:

A "Split Challenge" where a player simply attempt to knock down a particular pin split or a series of split formations to knock down, with one attempt per split formation;

A game that is less than 10 frames long or more than 10 frame long, such as a "3-Frame Challenge" where players play 3 frames instead of having to play all 10 frames (and where the third frame might follow the same traditional rules as the 10th frame), or a 20 frame challenge;

A challenge where a single pin is dropped over consecutive frames creating a 1 pin game, or where the game comprises successive events, starting with one pin, and then incrementing an additional pin each time player successfully knocks down all pins dropped;

A game without spare opportunities;

A game that provides the player with additional attempts to hit all of the pins down, such as three rolls per frame;

Other variations where less than the standard 10 pins are utilized, such as frames where only the front 6 pins are set (with or without a spare opportunity per frame) or various other pin configurations such as only the 7-10 pins, etc. (including, in systems which allow for more than 10 pins, events that require the player to knock down 10 pins or less, or more than 10 pins, such as a higher number of pins or successively increasing numbers of pins).

Of course, the various events (singular or in combination) that may be created are nearly limitless.

As noted above, aspects of the invention may be implemented by various configurations of systems of the invention. In one embodiment, such a system comprises at least one controller, one or more event monitoring devices, one or more player interfaces, and preferably, one or more game or event presentation devices.

Figure 5:
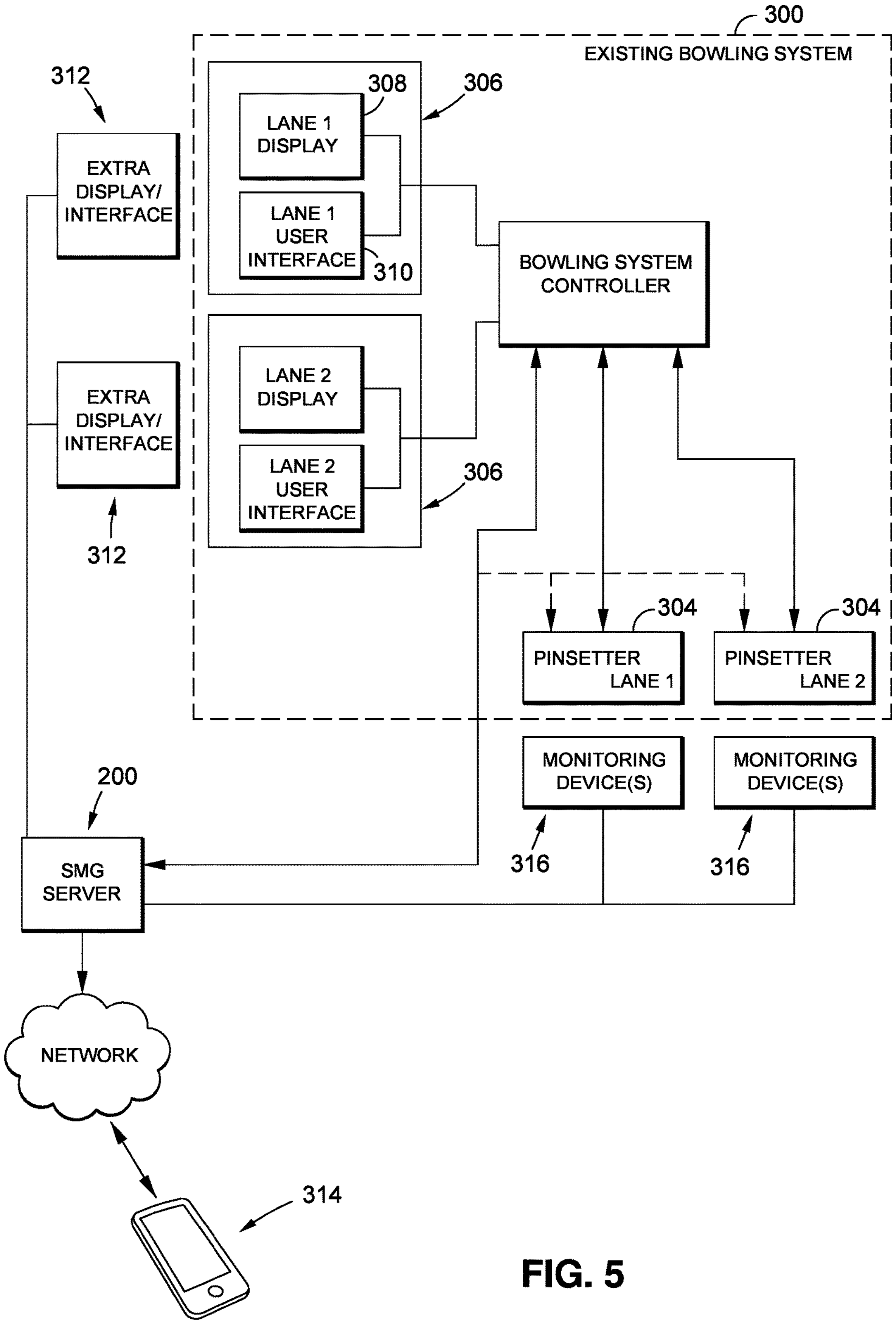
FIG. 5 illustrates an embodiment of a gaming system in accordance with another embodiment of the invention.

For example, aspects of one or more systems for presenting a bowling wagering game are illustrated in FIG. 5. Such a system might comprise a completely new or custom-configured bowling system, or an existing bowling system which is modified to present the present invention, such as via integration with other devices.

In one embodiment, the at least one controller may comprise a game server 200 of the invention, a bowling system controller 300, or a combination thereof. The one or more player interfaces may comprise one or more of: (1) an existing bowling system interface 306, such as an existing lane display 308 and a lane user interface 310 (comprising one or more user input devices, such as a touchscreen, buttons, etc.) of an existing bowling system; (2) a separate or secondary user interface 312, such as video display with a touchscreen and/or other user input device(s), a kiosk, etc., and/or a player's device 314, such as a user's mobile communication device (phone, tablet, etc.). The one or more event monitoring devices may comprise, for example, an existing bowling lane pinsetter 304 or other pin monitoring technology (cameras, etc.) used by the bowling system, or separate or secondary event monitoring devices 316, such as pin RFID readers, cameras or other sensors or devices. The one or more game presentation devices may comprise, for example, the lane pinsetters 304 and/or other equipment for presenting the bowling game.

As one example, in one embodiment, an existing bowling system 300 may essentially be integrated with a game server 200 in order to implement the present invention. For example, the existing bowling system 300 might be modified (such as with updated software executed by the bowling system controller 302, including one or more API's) to send information to and receive information from the game server 200. In one example of the use of such a system, the bowling system controller 302 might be configured receive player identification or login information at the existing lane interface 306 and, when received, transmit that information to the game server 200, thus allowing the game server 200 to identify the player (and thus, for example, look up the player's skill level, update the player's skill level, present player-specific game options, etc.). In response to a player's request to play a wagering game of the invention (such as input to the lane interface 306, including a wager or entry fee of an amount), the game server 200 may deduct the wager or entry fee from a player's account or balance of funds (or from other provided funds) and then present one or more game options to the player. These options may be routed from the game server 200 to the bowling system controller 302 for presentation at the lane presentation device 306. When multiple game options are presented, the player might select one of the game options, or when a single option is provided, might select "start game." The game server 200 may then cooperate with the bowling system controller 302 to present the game, such as by the game server 200 sending instructions to the bowling system controller 302 with game data, such as the number and/or arrangement of pins that the bowling system controller 302 should instruct the lane pinsetter 304 to set. The bowling system controller 302 may send instructions to the pinsetter 304 and then receive information back from the pinsetter 304 regarding the results of the player's roll, such as the number of pins knocked down. This information may be transmitted to the game server 200 for determining the outcome of the game (based upon one or more rolls, etc.), and the result of the game may be presented to the player via the lane interface 306 (such as "Congratulations, you WON $100"), and wherein a player might be awarded winnings to a player account or the like.

In another embodiment, the existing bowling system 300 might be modified to present wagering games of the invention and/or be custom configured to present wagering games of the invention, wherein the bowling system controller 302 may be modified to perform the functions of the game server, such as via updated software. In such a configuration, the existing bowling system 300 may essentially be modified to comprise a game system of the present invention.

In yet another embodiment, a system of the invention might comprise other combinations of existing bowling system features and additional devices. For example, in one embodiment, instead of using the existing lane interface 306 to receive player input and present game information, secondary device(s) might be used. For example, a player might download a game application onto their user device 314 and provide inputs to the application, such as player identification information, wager inputs, etc., and wherein game information may then be presented to the user via their device (via the application). In another embodiment, as illustrated in FIG. 5, one or more secondary displays or interfaces 312 may be located at an existing bowling lane (such as in addition to the existing lane interfaces 306) for receiving player inputs, displaying game information and the like. In this manner, the existing lane interface 306 may display information and receive inputs relative to the existing bowling system controller 302, and the game server 200 may receive game play inputs and display game information via the secondary displays or interfaces 312.

Also, the game server 200 may communicate directly with the pinsetter 304, such as for setting pins in a unique configuration (by-passing the bowling system controller 302).

In one embodiment, the game server 200 may also receive game play information from one or more secondary or separate monitoring devices or sensors 316. For example, instead of modifying the bowling system controller 302 to permit communications between the game server 200 and the bowling system controller 302, such as to receive information from the pinsetter 304 about how many pins a player knocked down, one or more additional monitoring devices 316 might be associated with a bowling lane (such as cameras, etc., as noted above), whereby game result information may be independently obtained/determined and provided to the game server 200.

Of course, other variations of systems may be utilized to implement the invention. For example, a system might include a player kiosk. In the case of a bowling alley, a kiosk might be centrally located or kiosks might be located at each lane. The player might utilize the kiosk as input device to either the gaming server 200 and/or bowling system controller 302, such as to reserve and/or pay for a lane, place one or more wagers, select games to play, etc.

As indicated herein, in one embodiment of the invention, a player may elect to play a wagering game, such as a bowling game, and a user interface may be configured to display various wagering opportunities which can be selected by the player. In similar fashion to play of a gaming device or machine 100A,B described herein, relative to a bowling event, a player might select a desired "Event with 10:1 Payout" option. Upon receiving such an input from the player, the server 200 may utilize the player's skill level to determine or more events having odds which, based upon the player's skill level, have an associated 10:1 payout ability. The events might comprise a single event or multiple events, where the player can select one of the events from the different options.

The system may then be configured to control the pinsetter of the lane to present one or more events (such as one or more frames) that have the required difficulty level. As an example, the system might cause the user display (of the user device, lane display, secondary display, etc.) to indicate "10:1 Payout challenge: Pick up a 1, 9, 10 spare", at which point the pinsetter is controlled to set a 1, 9, 10 pin configuration for the player.

Thus, as one aspect of the invention, existing games, such as the game of bowling, may be modified or enhanced in other manners, such as to create new challenges, including to vary the difficulty level of the event. These changes might comprise changes in rules or other changes.

Of course, other types of modifications might be made to such games or events. As one example, relative to a bowling lane, one or more projection elements might be used to display secondary objects. For example, one or more projection elements might be used to display bonus symbols or other features at one or more locations of a bowling lane. Light beams or other detectors may then be used to detect a player's bowling ball, such as to determine if the player's ball hit a bonus symbol.

As one example, a modified bowling game might comprise a "Angry Birds Challenge" where projections of objects to be "knocked down" on the ball path from the player to the pins would be displayed. If the path of the player's ball crosses those projections, the displayed objects might be displayed. These features might be used to increase the difficulty level of the challenge—either for the purpose of "normalizing" the odds and payout relative to players of different skill levels, or to allow the payout for a success to be changed as described herein.

In another embodiment, the ball path of the player might be tracked relative to a virtual environment, such as in an "Angry Birds" video game where the player's ball path is used as the trajectory of a virtual bird in the virtual environment and where the virtual bird may impact one or more virtual objects or the like, as part of a virtual game outcome (and where the player controls their ball, such as its path, in order to try and obtain desired outcomes of the virtual game). In such a configuration, relative to the system illustrated in FIG. 6, the game server 200 may generate virtual game information which is displayed to the player, such as via the lane display 308 and/or the additional displays 312. The game server 200 may receive information regarding the path of the player's ball, such as from the one or more sensors 316 or other monitoring/detecting devices, and then map that ball path to events in the virtual game environment. Once again, the difficulty of the event and/or the payout of the virtual event may be controlled based upon the principles described herein.

In other embodiments, challenges such as the above might be used for other purposes, such as to award other types of awards (e.g. other than winnings for a wagering game). Such might comprise: (1) A player rating which shows improvement over time; (2) Points for playing and/or beating new challenges, which can be redeemed for prizes like free food, beverages, hotel rooms, merchandise, or entry into sweepstakes and contents, etc.

As one example, a player might be presented with a bowling wagering challenge. In one embodiment, aside from the challenge of knocking down the pins, target symbols might be displayed on the lane. The player might be required to roll their ball over the target symbols and knock down the pins in order to achieve a winning outcome (e.g. the secondary displayed targets, etc., are used to vary the difficulty of the bowling event). In other embodiments, the player might win the wagering event by knocking down the pins, but if the player also hits the displayed targets, the player might be awarded a bonus, such as a secondary prize, points, etc.

As described herein, principles of the invention may be applied to a wide variety of other events. In such configurations, existing presentation technology might be modified based upon the principles of the invention and/or secondary devices or the like may be added to such systems in order to present skill-based wagering games of the present invention. For example, as noted above, relative to a "hitting competition" type event which includes a pitching machine, a game server may be configured to control the pitching machine and one or more sensors may be used to detect whether the player hit a particular pitch and/or the outcome of the hit (such as how far the ball was hit, etc.).

Further, the skill-based gaming event might comprise or require two or more activities. For example, the player might place a wager or entry fee than they can successfully drive a golf ball 300 yards and putt a golf ball 20 feet into the hole, hit five of ten baseball pitches or the like.

In one embodiment, as noted above, players might be assigned a single skill level or might have different skill levels, such as relative to different events. For example, a Player A might be assigned a high skill level for golf events, but a low or different skill level for bowling events.

As indicated herein, one aspect of the invention is the determination of the skill level of a player and application of that skill level to a wager-based skill game. As noted herein, the skill level of a player may be determined or accessed in various manners. Preferably, the skill level is determined by one or more physical inputs or actions of the player, either via input to one or more devices or by sensing the player's actions. A wide variety of input devices or sensors may be used to gather the information and the types of physical actions which the player is required to perform may vary, including depending upon the wagering event. For example, in order to access the skill of a player in throwing a baseball, the player may be required to throw a baseball. Whereas, to assess the skill level of the player in putting a golf ball, the player may be required to putt. On the other hand, a player's skill might be determined from other actions or groups of actions. For example, a player might be required to throw a ball at a target, try and hit a pitched baseball and bowl a bowling ball as an assessment of the player's skill level (even as to other events, such as golfing).

As indicated herein, the invention may be applied to a wide variety of events. The configuration of the device or system for implementing the invention may vary depending upon the event or the environment. For example, as described above, in a casino setting, one or more dedicated gaming devices, such as the gaming device 122 illustrated in FIG. 3, might be utilized to present the events described herein. However, the configuration of the device or system for presenting the invention may vary, such as when the present invention is implemented in other settings, which includes environments other than casinos. For example, the invention might be implemented relative to a golf course or a driving range where the player putts or hits a golf ball relative to a large physical range or outdoor putting green or golf hole/fairway. In such a configuration, the system of the invention might be similar to that illustrated in FIG. 2B, where the input devices 250 comprise one or more user input devices, such as a mobile device 252, a kiosk 254, smart watch or fitness watch 256, etc.), the sensors 260 comprise one or more sensor or devices used to determine player actions (or the result thereof) and a computing device, such as a remote server 270. As one example, at a driving range, a tee box might include a user interface 250 which includes one or more user input devices such as buttons, a touch screen or the like, such as for the user to make selections of events, wagers, etc. as described herein. The interface 250 might also facilitate placement of a wager or entry fee, such as via a wager accepting device (such as a coin or bill validator) or by electronic payment (such as from a digital wallet or other electronic payment vehicle). In some embodiments, the interface 250 might, as indicated herein, include or comprise a user's device, such as a user's mobile communication or computing device 252, 256 that includes a browser interface to an event server or an application running on a processor of the user device. For example, the user device might comprise a tablet, phone, PDA or other device. Selections of events, placement of wagers, etc. may be received by the user interface and be provided to the remote server. Other types of interfaces or input devise may comprise kiosks and audio and/or video recognition devices (Amazon Echo, etc.). Such input devices or interfaces might be worn or be associated with other equipment (golf bag, golf clubs, hat, glasses, clothing, golf cart, etc.)

In such a configuration, various types of sensors or other devices might be used to determine, either directly or indirectly, the result of the player's inputs. These may include, but are not limited to, accelerometers, motion detecting devices, velocity measuring devices (radar, dual radar, Doppler radar, Lidar, etc.), distance measuring devices, force measuring devices (strain gauges, etc.), cameras or other image devices or sensors, identification tags (including but not limited to RFID tags, printed bar codes, etc.), location determining devices (GPS devices, etc.) pressure and/or mass sensors, light (visible or invisible) sensors, sound sensors, and others. For example, at a golf driving range, RFID tags may be associated with golf balls and those tags may be read, such as to determine a location where a ball is hit and thus the distance that the ball traveled, how close the ball is to the hole, etc. As another example, one or more cameras may track the path of a golf ball to determine the same or similar information. These or other sensors might be used to track the path or movement of a ball, the location of a ball, a hole sensor (such as for detecting a golf ball in the hole) etc., for determining an outcome of the event as to a particular player. Of course, the particular type of sensors or detector may vary, such as by the type of event, and might comprise more than one type of detector or sensor, including combinations of sensors or detectors, including in a mesh.

Such detectors or sensors might be positioned in various locations. For example, relative to a golf event, the detectors or sensors might be positioned at the tee box, in tee markers, in trees or bushes, in electrical or sprinkler boxes, at the pin or hole, around the green and/or fairway, on poles, on golf carts or other equipment. In some cases, detectors or sensors might be associated with anal craft such as blimps or drones.

Figure 2B:
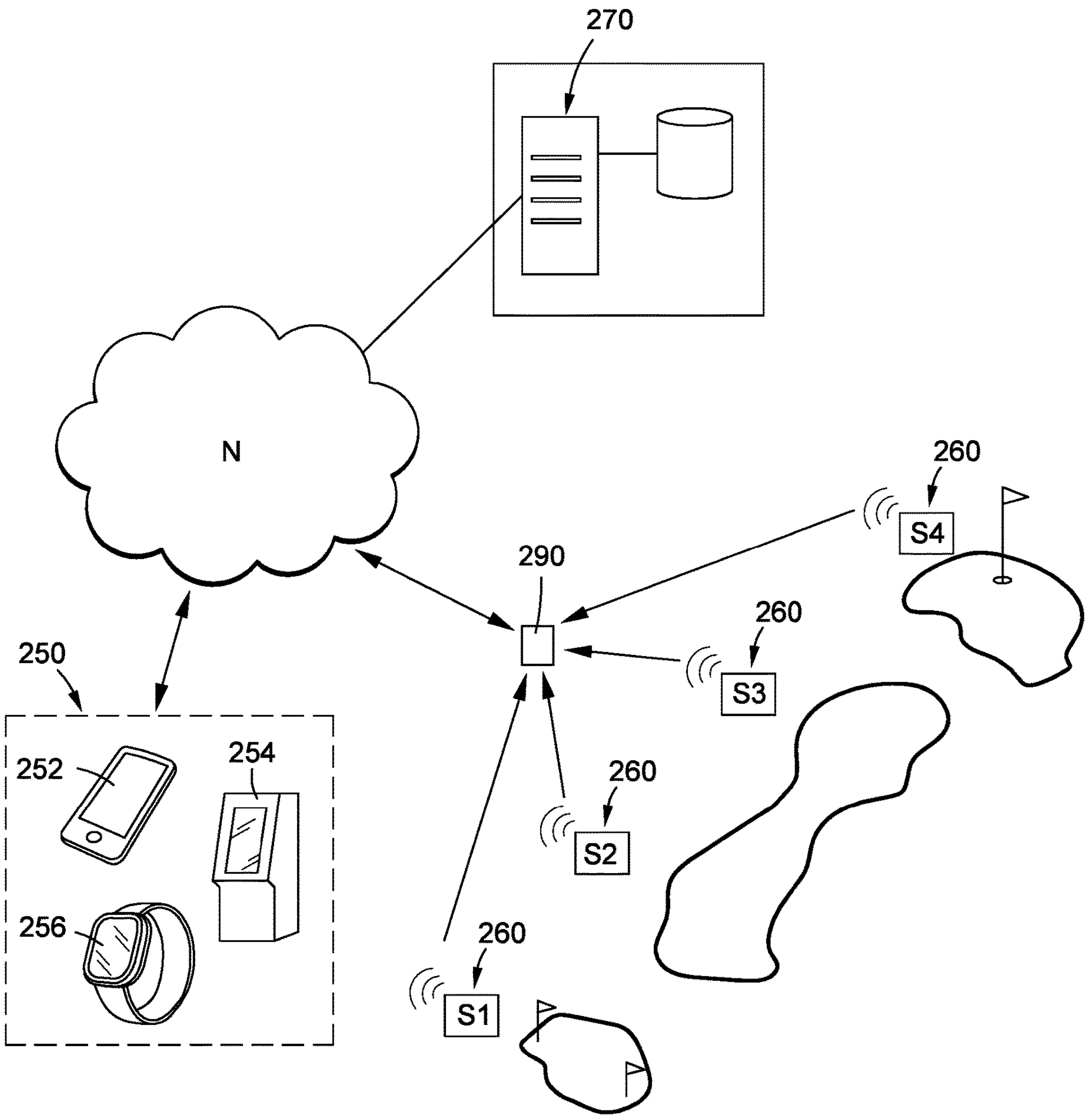

In some embodiments, the various input devices and detectors or sensors might be configured for wired communications, but most preferably wireless communications. For example, as illustrated in FIG. 2B, the input devices and detectors or sensors might comprise Wi-Fi enabled devices which sync with one or more Wi-Fi communication hubs 290 for communicating with the remote server 270, such as via one or more networks N (WANs, LANs, the Internet, cellular network, etc.).

In some embodiments, the system may automatically track the activity of a player. For example, a player might elect to enter a game via an input to an application running on their mobile device. Using information from the mobile device or an associated network which provides the location of the user, the system may determine the location and then present the event to the user. This may involve collecting information from the detectors or sensors at the user's location (such as Hole #1 of ABC golf course) to determine the actions of the player and the results of the event (wherein information collected by the one or more detectors or sensors at the location is provided to the server for processing and determining the outcome of the event). Winnings might then be paid, for example, to an account of the user. In some embodiments, facial recognition may be used to verify the identity of the user, such as by one or more cameras at the location of the user capturing their facial image for comparison to a stored image (associated with the user who requested entry into the event via their mobile device, etc.).

As noted above, in some embodiments, the skill level may be determined or set at least partially based upon other factors, such as player age, sex, height, weight, or various other information such as answers to questionnaires, social media information or the like (e.g. answers to questions like "how often do you golf?", etc.). In one embodiment, an operator might view or assess a player or a player's actions and enter information into the gaming device or system for use in setting or determining a player's skill level.

In one embodiment, a player's skill level is at least partially determined by one or more initial attempts at the game (though as indicated above, the skill level is preferably determined wholly or in part based upon other events or information). As noted below, a player might be assigned an initial base rating and the player's rating might then be adjusted based upon additional information. For example, the player's base rating might be set at the highest level (such as 100 on a scale of 100) to minimize the risk to game operator. Based upon additional information which suggests that the player doesn't truly have a skill level of 100, the player's skill level may be adjusted downwardly. As one example, relative to a putting event in which a player attempts 3 flat putts, 2 putts with a 3 degree right-to-left break and then 1 putt with a 6 degree right-to-left break, the player's skill level might be adjusted after the entire event, or after each individual putt—and then the odds/payout for the event may be similarly adjusted. In one embodiment, a player might place a wager or entry fee on the entire event and then the odds may be applied to the entire event, or in another embodiment the player might be required to place a wager or entry fee on each putt/event and where the odds and associated payouts may thus vary based upon the adjusted player skill level after each putt (for example, the odds/payouts on the first 3 putts might be better than average while the odds/payouts on the last three putts might be less than average).

The skill based gaming event requires one or more physical player actions or inputs. However, the type of skill based gaming event may vary. In one embodiment, the skill-based event may be live, virtual or a combination thereof. For example, the skill based gaming event might comprise hitting a baseball. The player might swing a physical bat and a physical ball in this event. Alternatively, the player might swing a physical bat at a virtually pitched ball, such as one which is shown on a video screen (combination of live/real and virtual). As another example, a player might throw a virtual baseball by simply moving their arm in a pitching motion relative to a plurality of sensors. Thus, the invention can be implemented relative to a wide variety of different skill-based activities or events.

Variances in event difficulty can be introduced in various manners. For example, relative to a golf ball putting event, the distance of the putt to the hole might change. However, in other embodiments, the slope or shape of the putting surface might be changed. Likewise, in a baseball batting contest, the speed or type of pitches might be varied to change the event difficulty. Relative to golf, factors such as tee box location, hole selection, hole location, fairway/rough conditions, hazards (trees, water, sand traps), weather conditions (wind, rain) and a whole host of other factors may determine the difficulty level of the event.

As indicated above, in one embodiment of the invention, a payout for a winning game outcome may be determined based upon the player's wager or entry fee and the calculated or determined likelihood that the player will successfully complete the event (e.g. obtain a winning outcome), which likelihood is based upon the determined player skill level in relation to the difficulty of the event.

It will be appreciated that certain events may have a difficulty which, in relation to the player's skill level, result in a very high probability of the player obtaining a winning outcome—such as a 99-100% probability of a winning outcome. In such instances, the system and method of the invention may be configured to eliminate or not present those events to the player (such as by not including them on a list of player selectable events, etc.), since there is effectively no "risk" or chance that the player will lose the event. Instead, only those events having a higher difficulty and which, in relation to the player's skill level, are determined to have a lower probability of success, may be presented to the player and/or made available for selection by the player.

In other variations, when it is determined that the probability of success is very high, the amount that the player is permitted to wager or entry fee and/or the amount that is paid in winnings, may be reduced greatly, thus reducing the risk of the game to the house. For example, if the probability of success as to the player for a particular event is 95% and the payout is set to 10% of the wager or entry fee, instead of permitting the player to wager up to $100, the player might only be permitted to wager up to $1 (thus causing the maximum winnings payable to the player to go down from $10 to $0.10) or by simply reducing the payout to a minimal value (e.g. even a $100 wager or entry fee only pays $0.10 if won by the player), whereby the player is disincentivized from the playing the game and/or the amounts paid by the house to such a player is so small that it can be absorbed into the total return to the house against all players.

As described, the invention may be implemented in a "player vs. machine" type format, such as where a single player places a wager or entry fee on the outcome of a skill based event presented via the device and the player's outcome is then evaluated. In casino terminology, such event is essentially a "player v. house" event.

Of course, the invention might be applied to other types of wagering configurations. As one example, the present invention may apply to as few as one player or multiple players. For example, as detailed above, a single player might place a wager or entry fee that they will achieve a successful skill-based gaming event outcome and that single player may then participate in the event and the outcome is determined based upon that single player's performance. However, in other embodiments of the invention, players may play against one another, and/or two or more players (a "Group") may participate in one or more events as part of a game.

Player v. Player

In one embodiment, instead of a player vs. house event, players may play against one another. For example, a first player may place a wager or entry fee upon the outcome of the play of an event by a second player. As another example, a first player may participate in an event against a second player, where a system of the invention sets the odds or difficulty for the event for the players.

Set forth below are examples of this configuration of the invention. In these examples, the principles of the invention are utilized, namely: 1) as to an event having the same odds for Player 1 and Player 2, setting the difficulty of the event for Player 1 and Player 2 based upon their skill levels; or 2) as to an event having the same difficulty level for Player 1 and Player 2, setting the odds (and/or payout) for a successful game outcome dependent upon the player's skill level. For example relative to the example below (Golf, Closest to Pin, example A1), for the same payout for a winning outcome, the difficulty of the event is set higher for Player 1 than Player 2 because Player 1 has a higher skill level than Player 2. In the example below (Golf, Closest to Pin, example, B), for the event having the same difficulty level for Player 1 and Player 2, the payout (as based upon an amount wagered or an entry fee) is lower for Player 1 who has a higher skill level than Player 2.

Event: Golf, Closest to the Pin

A) Varying Difficulty, Same Payout

Example 1: Distance variation, End ball location within 20 feet of the pin/5 shots/ties broken by ball number: Player 1 (above average): 150 yard target and Player 2 (below average): 100 yard target Example 2: Target Size variation/5 shots/ties broken by ball number 100 yard target: Player 1 (above average): 10 feet and Player 2 (below average): 30 feet B) Varying Payout, Same Difficulty Example: 100 yards, 20 feet target/5 shots/ties broken by ball number: Player 1 (above average): $10 entry fee and Player 2 (below average): $2 entry fee Event: Golf, Chip Shot A) Example 1: Varying Difficulty, Same Payout "End ball location within 10 feet of the pin"/5 shots/ties broken by ball number: Player 1 (above average): 75 yard target and Player 2 (below average): 25 yard target B) Example 2: 50 yards/Varying Payout, Same Difficulty/5 shots/ties broken by ball number: Player 1 (above average): $10 entry fee and Player 2 (below average): $2 entry fee Event: Golf, Longest Drive A) Example 1: Varying Difficulty, Same Payout/5 shots/ties broken by ball number: Player 1 (above average): Over 280 yards, fairway 25 yards wide and Player 2 (below average): Over 200 yards, fairway 50 yards wide B) Example 2: 250 yards/Varying Payout, Same Difficulty/5 shots/ties broken by ball number: Player 1 (above average): $10 entry fee and Player 2 (below average): $2 entry fee Event: Bowling, Strike Challenge A) Example 1: Varying Difficulty, Same Payout: Player 1 (above average): 3 strikes over 5 frames and Player 2 (below average): 1 strike over 5 frames B) Example 2: 2 strikes over 5 frames/Varying Payout, Same Difficulty: Player 1 (above average): $10 entry fee and Player 2 (below average): $2 entry fee Event: Bowling, Pin Challenge A) Example 1: "Knock all the pins down"/Varying Difficulty, Same Payout: Player 1 (above average): All 10 pins and Player 2 (below average): Pins 1-6 only B) Example 2: "Get a spare"/Varying Payout, Same Difficulty: Player 1 (above average): $10 entry fee and Player 2 (below average): $2 entry fee Of course, any number of events may be presented as described herein. In this embodiment, two or more players may play against one another, wherein the wager/entry fee or payout for each player may be the same and then the difficultly level of the event may be customized for each player based upon their relative skills, or the wager/entry fee or payout for each player may be different, with all players playing the same event. The players place the appropriate wager or entry fee and then each participate in the event, the outcomes are determined and payouts are awarded for winning outcomes.

Contests

In one embodiment, one or more players (preferably two or more) may enter a contest. A contest is an event which is defined by one or more challenges when certain target criteria are met, wherein if a player of the content meets the one or more criteria the player is a winner of the challenge and if not, the player loses the challenge. In accordance with the invention, either: (1) the difficulty level of the one or more challenges are varied based upon player skill level so that winners of the contents are paid the same payout; or (2) the difficulty level of the one or more challenges is the same for all players, but the payout (winnings or the event entry fee or wager) varies based upon player skill level. Set forth below are various example of these principles:

Event: Golf, 3 Foot Challenge—Hit Balls Until You Get within 3 feet from the hole (10 balls max)/Ball Number at which you achieve the target is your final score/If no ball achieves target, then closest ball is measured along with ball number A) Example 1: Varying Difficulty, Same Payout: Player 1 (above average): 150 yards and Player 2 (average): 100 yards and Player 3 (below average golfer): 50 yards B) Example 2: Varying Payout, Same Difficulty/100 yards: Player 1 (above average): $20 entry fee and Player 2 (average): $10 entry fee and Player 3 (below average): $2 entry fee Event: Golf, Sink a Chip—Hit Balls Until You Sink a Ball (10 balls max)/Ball Number at which you achieve the target is your final score/If no ball achieves target, then closest ball is measured along with ball number A) Example 1: Varying Difficulty, Same Payout: Player 1 (above average): 50 yards and Player 2 (average): 25 yards and Player 3 (below average golfer): 10 yards B) Example 2: Varying Payout, Same Difficulty/25 yards: Player 1 (above average): $20 entry fee and Player 2 (average): $10 entry fee and Player 2 (below average): $2 entry fee Event: Bowling, Back-to-Back Marks—Bowl frames until you get back-to-back marks (strike or space)/Frame Number at which you achieve the target is your final score/If no back-to-back marks, then no one wins the contest A) Example 1: Varying Difficulty, Same Payout: Player 1 (above average): 3 frames and Player 2 (average): 6 frames and Player 3 (below average golfer): 9 frames B) Example 2: Varying Payout, Same Difficulty/5 frames: Player 1 (above average): $20 entry fee and Player 2 (average): $10 entry fee and Player 3 (below average): $2 entry fee Event: Bowling, Split Challenge—Bowl frames with a pre-determined split configured as the target (5 attempts)/Frame Number at which you achieve the target is your final score/If no split is "picked up" or knocked down, then no one wins the contest A) Example 1: Varying Difficulty, Same Payout: Player 1 (above average): 7-10 split and Player 2 (average): 4-5 split frames and Player 3 (below average golfer): 3-10 split B) Example 2: Varying Payout, Same Difficulty/4-5 split: Player 1 (above average): $20 entry fee and Player 2 (average): $10 entry fee and Player 3 (below average): $2 entry fee Tournaments In one embodiment, two or more players may enter a tournament. A tournament is an event which is defined by one or more challenges and where the performance of players of the tournament are ranked, such as based upon their performance relative to criteria of the tournament. In accordance with the invention, either: (1) the difficulty level of the one or more challenges are varied based upon player skill level so that winners of the contents are paid the same payout; or (2) the difficulty level of the one or more challenges is the same for all players, but the payout (winnings or the event entry fee or wager) varies based upon player skill level. Set forth below are various example of these principles:

Event: Golf, Closest to the Pin

A) Example 1: Varying Difficulty, Same Payout

"End ball location closest to the pin"/5 shots/ties broken by ball number: Player 1 (above average): 150 yard target and Player 2 (average): 100 yard target and Player 3 (below average): 50 yard target B) Example 2: Varying, Same Difficulty Example: 100 yards/5 shots/ties broken by ball number: Player 1 (above average): $20 entry fee and Player 2 (average): $10 entry fee and Player 3 (below average): $2 entry fee Event: Golf, Longest Drive A) Example 1: Varying Difficulty, Same Payout "Distance past target"/5 shots/ties broken by ball number: Player 1 (above average): 200 yard target and Player 2 (average): 250 yard target and Player 3 (below average): 200 yard target B) Example 2: Varying Payout, Same Difficulty 250 yards/5 shots/ties broken by ball number: Player 1 (above average): $20 entry fee and Player 2 (average): $10 entry fee and Player 3 (below average): $2 entry fee Event: Bowling, 5 Frame Challenge/"Get the highest score"

A) Example 1: Varying Difficulty, Same Payout

"Get the highest score": Player 1 (above average): 6 pins per frame (random) and Player 2 (average): 6 pins per frame (pyramid) and Player 3 (below average): 10 pins per frame B) Example 2: Varying Payout, Same Difficulty 10 pins per frame: Player 1 (above average): $20 entry fee and Player 2 (average): $10 entry fee and Player 2 (below average): $2 entry fee Event: Bowling, Split Challenge—Bowl frames with a pre-determined split configured as the target (5 frames)/ Number of Splits "picked up" or knocked down is the primary score/If no split is "picked up" or knocked down, then highest number of pins knocked down wins A) Example 1: Varying Difficulty, Same Payout: Player 1 (above average): 7-10 split and Player 2 (average): 4-5 split frames and Player 3 (below average golfer): 3-10 split B) Example 2: Varying Payout, Same Difficulty/4-5 split: Player 1 (above average): $20 entry fee and Player 2 (average): $10 entry fee and Player 3 (below average): $2 entry fee Group Play In one embodiment, Group play may involve different players of the Group having different target outcomes, the same target outcome (such as based upon an average skill level as described below), or a combined target outcome.

As one example, Players A and B may collectively place a $100 wager or entry fee that Player A can drive a golf ball 300 yards and Player B can putt a golf ball into a hole 20 feet away—e.g. each player in the Group has a different target outcome which is based upon their individual skill level. In this instance, the skill levels of the players are determined and odds and a payout may be set based upon the skill levels of the players relative to those activities, collectively.

In one embodiment, the Group may play "against the house", wherein a Group target outcome can be a set result which is determined by a group skill level. For example, in the case of virtual golf, the Group can be comprised of players of varying skill levels. A Group Skill Level may be determined based on the individual skill levels, wherein the target is based on the Group Skill Level.

For example, in a "Closest to the Pin" golf game, the Individual Skill Levels for three players in a participating Group may suggest a target of 10 feet for Player 1, 15 feet for Player 2 and 20 feet for Player 3. A Group target (e.g. the same target outcome for each player) may then be calculated and set at 8 feet for the Group.

For example, in the case of bowling, the Group can be comprised of players of varying skill levels. The Group Skill Level is determined based on the individual skill levels, and the target may be based on the Group Skill Level. In a "Three Frame" bowling challenge, the individual skill levels for the three players may suggest a target of 45 for Player 1, 30 for Player 2 and 15 for Player 3. The Group Target (e.g., a combined target outcome) may then be calculated as a total of 90 for the Group.

In another bowling example, the Group can be comprised of players of varying skill levels. The Group Skill Level is determined based on the individual skill levels, and the target is based on the Group Skill Level. In a "3 Pin" bowling Challenge, the individual skill levels for the three players may suggest that Player 1 has a very difficult 3-pin Split, Player 2 has an easier 3-pin Split, and Player 3 has the first three pins (Pins 1, 2, and 3) as their targets. If any of the players of the Group achieve their target, all of the players in the Group may be declared to be winners (and may be paid winnings, where the winnings may be the same or might vary, including based upon skill level, based upon whether they were the won achieved the target or were just a participant in the Group, etc.).

Group games can be played simultaneously with individual games, so that rewards for individual wagering game play can be earned in parallel to the Group performances.

For example, a Group can choose to enter a Group game before playing 18 holes of golf or bowling a 10 frame game. During gameplay, individual A may elect to wager upon and play one or more skill-based games of the invention on their own. As the Group (which includes individual A) achieves Group targets during gameplay, the members of the Group are rewarded independently of their individual game performance. For example, when golfing, a player may enter a series of contents and tournaments which they do not win. But, since they entered a Group game, they can be rewarded if their other group members hit the targets, their Group aggregate performance hits the targets, and/or they hit Group targets for which they did not choose an individual game or whose individual game outcomes were not met.

A Group of 3 players can choose to enter an 18 Hole Group Golf Challenge, with each player choosing to enter other individual games before and during the 18 hole gameplay. The 18 Hole Group Golf Challenge prizing is based on the Group Skill Level. As the players play, their Group earns rewards for meeting certain outcomes or targets. Examples of outcomes include, but are not limited to, 2 pars on a hole, 2 drives over 275 yards, a Birdie and an aggregate score of Even on a particular hole. The same methodology which is used to create payouts and games of based on individual skill levels are applied to the group, so that the difficulty of the game or the amount of the payout varies based on the Group Skill Level.

In another example, a group of 3 players can choose to enter a 10 Frame Bowling Challenge, with each player choosing to enter other individual games before and during the 10 frame gameplay. The 10 Frame Bowling Challenge prizing is based on the Group Skill Level. As the players play, their group earns rewards for meeting certain outcomes or targets. Examples of outcomes include but are not limited to 2 "Marks" (spare or strike) in a frame, one "Turkey" (three straight strikes), a Spare successfully picked up and an aggregate score of 50 in a frame. The same methodology which is used to create payouts and games of based on individual skill levels are applied to the group, so that the difficulty of the game or the amount of the payout varies based on the Group Skill Level.

Prizes may include, but are not limited to, rankings, badges, cash prizes, and/or rewards like free food & beverage, tickets to an event, and extra gameplay time.

Group can play "against the house" versus set targets or in tournaments and contests against other groups.

As another example, the invention may be applied in a tournament format. For example, 20 players may each place a wager or entry fee that they won't miss a putt. Each player might putt a golf ball at a hole 5 feet away. Those that miss might be eliminated and the remaining players might then try and putt a golf ball into a hole 10 feet away, and so on, until only one player remains (and may be declared the winner). In configuration, the payout to the winner(s) may be dependent upon the skill levels of the players relative to the defined event and/or the "buy-in" or initial wager or entry fee which each player must place to participate may vary based upon the players' skill levels (or course, in other embodiments, each player might be required to make a putt of a different distance or difficulty which varies based upon the player's skill level, as described herein).

Currently, players of varying skill levels are unable to effectively and efficiently play for prizes with the rewards based on their performance. In some cases, like daily fantasy sports, players are qualified by skill based on the amount of games they have played. This is lacking insomuch as the quantity of their gameplay does not often relate to their performance in the game. In other cases, like tennis or chess, finding players with equivalent skill levels is difficult, providing a lack of liquidity in the market of games. For games that match players, like those provided by Skillz, the players are limited to player versus player results, in a winner-take-all format or ranked tournament format that limits the playout options. For players of varying skill levels, like golfers, there are tournament formats that integrate relative skill, like the golf handicap system. But such handicap systems are limited insomuch as they don't provide the level of fidelity on individual player actions that allow for effective comparison on individual actions and specific skills. Moreover, the methodology of collecting and comparing results are limited by the gameplay, with manual collection and comparison of results being the norm. Additionally, prizing for gameplay is limited to payouts based on prescribed results without adapting to the relative skill and performance of the players.

In accordance with the invention, players of similar or different skill levels can compete in tournaments and contests, rewarding players based on their relative performance based on their individual skill level compared to the group's performance. Players can be matched with other players which have similar skill levels for the specific game being played, based on algorithmic determination of skill based on the specific actions in the game. Players of varying skill levels are able to quickly-and-easily enter tournaments and contests, without having to worry about whether there are enough players, since players of varying skill levels can join the tournament or contest. Players can be rewarded based on their relative performance, so that if they have an extraordinarily strong outcome, they receive greater prizes.

In this regard, in accordance with the invention, players are able to play games and be rewarded based on their performance by entering skill-based tournaments and contests with other players. Winnings or payouts may be based on the player's relative performance to their skill level and the performance of all other players in the tournament or contest. The greater availability of tournaments and contests allow players to enter at any time, with digital results and payouts sent to them on a timely basis. Further, extraordinary performances may be rewarded with extraordinary payouts.

For example, a player may enter a "Closest to the Pin" tournament in a virtual golf environment with a $10 entry fee and total prize pool of $100,000. The result of each player's gameplay is compared to the results of all other players in the tournament, adjusted based on the skill level for each player. The top players may be awarded prizes, such as with increasing payouts based on rankings and exceptional payouts for performances that deviate significantly from the expected result. For example, the top 10% of players may receive a reward equal to 5× their entry fee, the top 2% of players may receive 10× their entry fee, and there can be 30% of the entry fees allocated to extraordinary performances, with a 10% tournament entry fee to the operator. An extraordinary performance can be a Hole-in-One for players with advanced skill level or within 3 feet of the pin for players with beginner skill level.

As another example, a player may enter a "3 Frame" bowling challenge at a bowling alley lane with a $10 entry fee and total prize pool of $100,000. The result of each player's gameplay is compared to the results of all other players in the tournament, adjusted based on the skill level for each player. The top players may be rewarded by prizes, such as with increasing payouts based on rankings and exceptional payouts for performances that deviate significantly from the expected result. For example, the top 10% of players may receive a reward equal to 5× their entry fee, the top 2% of players may receive 10× their entry fee, and there can be 30% of the entry fees allocated to extraordinary performances, with a 10% tournament entry fee to the operator. An extraordinary performance can be a Turkey, or 3 straight strikes, for players with Advanced Skill Level, or getting two "marked" frames (spare or strike) for players with Beginner Skill Level.

The invention might also be applied to contests or promotional style events or wagering.

Back-betting may also be facilitated by the methods and systems of the invention. For example, Player A might place a $100 wager or entry fee that they can sink a 25 foot putt, where the payout for a winning outcome is $150. Bettor B might be permitted to place the same wager on Player A's outcome—e.g. a $100 bet that Player A will be successful (in a preferred embodiment, a back-bettor can only place a bet on another player's successful outcome and not an unsuccessful outcome, such as to prevent collusion between the player and the back-bettor where the player "throws" the outcome to allow the back-bettor to win). Of course, back-betting might be allowed in multi-player events as well. For example, Players A, B and C might each place bets that they can sink a 10 foot, a 25 foot and a 15 foot putt, respectively, Bettor B might place a bet specifically on Player C, betting that Player C will sink their 15 foot putt.

In one embodiment, the player's skill level is used in determining the "pure" odds and payouts for the event. In other embodiments, the player's skill level is partially used to determine the odds and payouts for the event.

Generalized Games

As described above, a player's skill level is utilized in the determination of the odds, payouts or difficulty of the skill-based wagering event. Of course, in some instances, the skill level of the player may not be known or the identity of the player might not be known.

As one example, the first time a player plays a game on a device or system of the invention, the skill level of the player is not known. As indicated, in one embodiment, the skill level of the player might be preliminarily assessed, such as by having the player provide one or more inputs which are used to provide or set an initial skill level of the player (which skill level may then be re-evaluated, such as based upon later game outcomes).

In another one embodiment, the player's skill level may initially be set at a base level, such as at an "expert" level or the highest level, and may then be adjusted (such as moved downwardly) based upon assessment of a player's actions or inputs. In this configuration, if "expert" level is correlated to the highest level of odds and the lowest payout, the house starts by offering the event in a configuration of lowest risk (e.g. the player is unlikely to be an expert and so they are likely to lose the event; if the player turns out to be an expert, the house only awards the lowest award).

Player Identity Validation

As described above, as one aspect of the invention, the identity of the player is determined, such as when a player signs in to play a game, and the identity of the player may be further confirmed or validated during play of the game (such as using facial recognition). In this regard, while it is known to generally identify a player who is playing a casino slot machine, this identification is usually limited to having the player provide a player tracking card which is linked to a player loyalty account. This process simply enables the casino to track game play relative to that tracking card or account and does not in any way validate that the player who presented the card is the player who is playing the game (for example, a man may insert his player tracking card into a gaming machine and his wife may then play games on the machine, whereby the wife's game play inure loyalty credits to the man's account). No additional player identification validation is needed because the actual identification of the player is irrelevant to the play of such "chance" outcome games.

On the other hand, in accordance with the present invention, validation of the player's identity is critical because in a skill game, the identity of the player who actually participates in the game is material to the outcome of the game. For example, without player identity validation, Player A with a skill level of 1 might identify themselves as the participant of a game herein. Then Player B, with a skill level of 10, might play the game on behalf of Player A, thus greatly improving the chances of a winning skill game outcome. Thus, as indicated above, it thus is preferable that the identity of the player be validated relative to games of the invention. Further, this validation preferably occurs relative to each player input that is made relative to a game. For example, in the case of a golf event, a player might be tasked with trying to birdie a particular golf hole. This may require the player to tee off, hit the ball from a fairway towards the green, chip onto the green, and putt one or more times. If a different player substituted for the original player in performing any of these actions, the outcome of the game may be substantially altered. It is thus preferred that the identity of the player be validated in association with each input.

In one embodiment of the invention, a player may be required to register or form an account in order to play one or more games. As part of this registration, one or more biometrics may be obtained from the player, such as a fingerprint, facial photo, retina scan, etc. The facial photo might be obtained, for example, from a registration kiosk by a camera. In such a configuration, the player may use the registration kiosk to input information which identifies themselves (name, address, etc.) and a photo of the player may be obtained and linked to a player account which is created for that player. The image might also be obtained from another source, such as a provided ID (driver's license, passport, etc.). Of course, a similar registration process might be implemented by a player's phone or computer, including by using a camera associated therewith.

As described above, when a player seeks to play a game of the invention, the player's identity may be confirmed. This information is preferably used, as described above, to determine game parameters, such as based upon a skill level which is assigned to the player. Further, however, the player's identity may be validated to ensure that the player who has identified themselves as the player of the game is the person who is participating in the event (providing the skill-based inputs). This confirmation may occur in various manners. For example, when the skill-based game is presented at a gaming device, such as the gaming machine 122 described above, a camera (or other image capture device), bio-sensor (fingerprint reader, retina scanner) or the like might be used to capture player information for comparison to the stored player information to validate the identity of the player.

In the case where the skill-based game is present in other environments, the validation may occur in other manners. For example, relative to a golf event such as described in relation to FIG. 2B above, one or more cameras or other data capture devices may be located at the golf course and may be used to capture an image of the player for comparison to the stored player image. As one example, a camera might be located at the tee box and may be used to capture an image of the player before or as they tee off. That captured image may be compared to the stored player image. If player identity can not be validated (via comparison of those photos), the wagering event may be terminated or the player may be required to re-validate their identity (such as before teeing off). Similarly, cameras located along the fairway, near the green, etc., may be used to capture images of the player when the player provides additional skill inputs.

Of course, images (or other player data) for use in validating the identity of the player might be obtained in other manners. For example, a drone might be used to capture player images. In another example, a player might be required to use a phone on their camera to capture an image of their face or additional surroundings at the time of an input. In one embodiment, this information, such as coupled with GPS information regarding the location of the player, may be used to validate that the player who is providing the game input is the player who identified themselves to play the game. In this regard, location information may be used to further validate the identity of the player, where the location information may be captured from devices of the player (phone, watch, etc.), devices provided to and worn by the player (dedicated golf course tracking device), or by external sensors.

As indicated, in one embodiment, identity validation preferably occurs at each player input, such as close in time thereto. As one example, a player who is playing a game using a golf simulator may sign into a kiosk associated therewith, thereby providing identification information. The kiosk may even capture an image of the player to validate the identity of the player at the time of the login. The player may then place a wager on an event and move to a simulation area to hit a golf ball. In one embodiment, one or more cameras may be used to obtain images of the player on or at the golf simulator, such as when the player is ready to hit the golf ball, to validate the identity of the player (and to ensure that a different player was not substituted after the player initially logged into the kiosk).

Of course, other manners of confirming that the player who has identified themselves as the participant in the event is the person who is providing the input, may be utilized. For example, in a golf or baseball event, a palm or fingerprint reader may be utilized to read the player's palm print or fingerprint for comparison to a stored palm print or fingerprint. Similar technology might be associated with a bowling ball or other event equipment, whereby the player provides direct input to the equipment that is used to provide the input as part of the player validation process. Also, while player identity information may be stored in a player account, validation might occur externally. For example, an outside validation service might store an image of a player and an image of the player that is captured during the event may be transmitted to the external vendor for comparison to the stored player photo.

Real Time Event Generation

As indicated herein, a variety of skill-based wagering events may be presented, including where the odds of winning the event, and thus an associated payout, is dependent upon the skill level of the player in relation to the difficulty of the event. It will be appreciated that in some events, the difficulty may be controlled or controllable—such as where a pinsetter is used to set a 7-10 split as compared to a 4-6 split. However, in other situations, event difficulty may continuously vary. As one example, two players might each accept wagers to try and birdie a particular golf hole. After each player hits their tee shot, the first player might have landed their ball on the green and the second player might have landed in a bunker. In that situation, the second player might be offered either modified odds or a new event which is associated with the probability of the player holing from the bunker. For example, the second player might have been offered 20:1 odds that they would birdie the hole in 3 shots (a par 4 hole). However, the second player, after landing in the bunker on their first shot, might be offered the chance to take 50:1 odds that they will hole out on their next shot from the bunker (in lieu of, or in addition to, the first wager). In this regard, a system of the invention may, as described above—such as in relation to FIG. 2B, collect real-time information regarding an event. This information may comprise information regarding the real-time (or near real-time) status of the game or event. Such information may be collected from various sensors, such as cameras (or other image capture devices), radar, LIDAR, RFID tracking, GPS and other sensors or devices (pinsetter, etc.). This data may be utilized by the system to generate new events or offer modifications to existing events, such as to calculate modified odds and payouts for existing events or new odds and payouts for new events.

As one example, as a player plays an 18 hole round of golf, aside from potential wagers on the outcome of the entire round or each hole, the player might be presented with a different wager on each upcoming shot, where the odds and payout for each presented wager is presented in relation to the real-time status of the event. (including the outcome of the previous input, such as shot).

In one embodiment, a variety of real-time or near real-time event information may be utilized. Aside from data such as ball location in a golf event, weather conditions (temperature, wind, rain, etc.), grass condition (fairway, rough, etc.), obstacles (trees, cart path, bunker, etc.) and other factors may be evaluated (such as based upon input from various sensors or systems, such as on-location sensors, weather stations or websites, etc.). Further, these principles may be applied to a variety of events. As another example, a player might place a $100 wager at 10:1 odds (for a $1000 payout) that they can bowl a 200 point game. During the third frame, the player's first roll might result in a 7-10 split which may be detected by the pinsetter, a camera or the like. The system might immediately offer the player an in-game wager at 100:1 odds that they can clear the 7-10 split on their second roll (such as via an associated kiosk, the player's mobile device, etc.).

In accordance with one aspect of the invention, information regarding a status of an event after a first skill-input (where the first skill-input comprises at least one input, and not necessary "a first" input) by a player may be received at a game server, where such information may comprise the location of a golf ball on a golf course, a number of pins and their configuration in a game of bowling, etc., such as collected by one or more sensors. The game server may generate a wager offer to the player, where the wager offer has a payout which is based upon a skill-level of the player and a difficulty level of achieving a winning outcome of the event after the first skill-input by the player based upon the information regarding the status. The player may accept or reject the game offer, where if accepted, the game server may receive, such as from one or more sensors, information regarding the player's performance in the event based upon at least one second skill-input by the player. The game server may then determine an outcome of the wagering game based upon the player's performance and award the associated payout to the player when the outcome is a winning.

Advantages and Other Aspects of the Invention

One aspect of the invention is a system and method where players are rewarded for an outcome of a skill-based event, based upon criteria dictated before the player's action(s) in the event. If a player successfully completes their task, they win their wager or entry fee and the associated payout.

In a preferred embodiment, the invention does not include a random number generator nor attempt to create or re-create an event where the outcome is randomly determined, such as in a game of slots. In one embodiment, the challenge associated with a game or event of the invention is clearly stated or defined to the player before the game or event starts (including relative to the defined payouts), with the players' skill being the determinant of the outcome (win/loss) of the event and the associated payout.

As one aspect of the invention, games and/or payouts are created based on the skill-level of the player. This novel method of game creation is different than other gaming systems which present a constant game and payout for all players. Moreover, the payouts are entirely known without any randomness. For example, in contrast to a slot game where the outcome is random and/or the award may vary, in accordance with the present invention, the player knows that their successful skill (without being modified, such as by the system) in achieving the required outcome will result in a particular payout. Thus, a player can, through their own action and skill, win an award by successfully completing the known event.

Aspects of the invention may thus comprise, but are not limited to one or more of:

A wagering skill game which has winning and losing outcomes, where prizes for winning outcomes are fixed and depend only on the outcome of the skill game;

A method of awarding payouts for a skill game where the award is solely determined by whether the player wins or loses the skill game;

A wager-based skill game where awards are based upon the skill of the player(s) and not randomly determined; and A method/system for non-randomized awards for a wagering skill game.

In one embodiment, the invention provide games or events of varying skill levels and/or payouts of known amounts for players with varying skill levels, and thus also provides methods of determining and updating the player's skill level. In accordance with the invention, players of skill-based games are assigned a skill level. In various embodiments, the invention permits the player's skill level or rating to: (1) update over time to reflect the overall progress of the player; (2) adjust for any shorter-term trends in player performance; and/or (3) reflect the player's skill in various elements (such as overall, by sport, by sub-activity within a sport, etc.)

In this regard, the invention overcomes issues associated with the prior art. For example, existing player rating systems are limited. Golf handicap systems only reflect the overall player performance, not their skill at a specific element of golf (like putting or driving). Moreover, the method of golf handicap calculation is arbitrary and fluctuating, as represented by the change in handicap calculation in 2020. Similarly, players are evaluated in video games based on their performance, but those systems are generally based on aggregate time played, tasks completed and performance. They do not accurately reflect a player's skill level, and/or are not applicable to real-world games wherein the player is interacting with a real world game input (like golf, bowling, baseball, etc.). When representing real world players in video games, the video game companies use people to arbitrarily rank players based on some statistics but often a fair amount of subjective input. Likewise, Elo systems are used for chess rankings but have not been adopted for other sports. The Elo system is also an overall win-loss system, without input from individual actions.

In accordance with the present invention, because a detailed and reliable player skill level can be determined, games can be created to maximize engagement while optimizing monetary sustainability for wagering. For example, wagering events can be specifically structured to provide specific long-term return-to-player (such as a particular RTP of 85% over time), so that in aggregate, the game is profitable, but any specific player may win in the short-term or even the long-term based on their individual performance.

For example, as a player plays a "Closest to the Pin" golf competition where the player hits a ball from a certain distance away in a virtual golf simulator to a pin, the player's action data is collected. This data is combined with all previous data to, relative to future events, change or control either: 1) the payout and/or 2) the distance to the pin. A predictive algorithm generates or selects payouts and/or distances which create an expected value (EV) of 85% of the wagered amount. So, for a player with a high skill level (90 out of 100 for iron approach shots of about 100 yards), the target may be 10 feet for a 1:1 payout. The player will have confidence they can meet this target. The game has confidence that the player will likely only meet this target 42.5% of the time. Both player and game are satisfied by their game setup. When the player plays, additional data is collected which informs future game setups. If the player consistently performs well, their skill level will increase, resulting in either a decreasing in the size of the target (from 10 feet to 8 feet to 6 feet) or a decrease in the payout (from 1:1 to 2:3 to 1:2).

The same inventive concept can be applied to other games within golf and other games of different types. For example, for bowling, the player can have an overall medium skill level (60 out of 100), but show a lower skill level in picking up particular spares late in games (a/k/a they do not perform well under high leverage situations). In that case the player's sub-skill of spares and sub-skill of high leverage event may be lower (20 out of 100 for each). In such event, the payouts for these wagers may be assigned to be higher than in starting frames or low leverage situations.

In one embodiment, various external information may be used in determining or assigning the player's skill level. In a preferred embodiment, all skill levels and sub-skill levels are informed by all data points, updating to reflect the most recent data alongside historical data and overall system data from all players. In the prior art, some games involve use of subjective skill level, such as where the player picks a level of difficulty they believe matches their skill level. As noted above, in other variations, the prior art includes assigning a skill level, such as a handicap, based upon event outcomes. Outcome based skill determination has a number of drawbacks, including that outcomes are not always predictive of the player's skill level (since, for example, positive outcomes will statistically occur even when a player's skill level is low) and because outcomes of one event are not necessarily correlative to the potential for positive outcomes in other events, among other drawbacks. Unlike the prior art, in the preferred embodiment of the invention, the skill level of a player is objectively determined, and is also determined based upon actions and not just outcomes. Thus, a skill level can be determined for a player which accurately reflects their true skill level, including a skill level for events where the player has not even yet registered an outcome or where the number of outcomes is too low to be predictive of the player's skill.

Another aspect of the invention comprises games or events, and particularly wagering events, which vary based upon player skill level. Currently, there is no consistent way for a player to wager on their own skill at a particular task. Games that allow a player to provide input of difficulty simply allow the player to choose their own skill level or game difficulty, and therefore compete based on their self-assessed ability. The player interacts with a display screen (including but not limited to onsite tablet, keyboard and screen entry, video game controller or smartphone) to choose a game. For example, when playing in a virtual golf simulator, the player selects the challenge or course. There is no suggested game based on their past performance. As another example, in video games, players often "unlock" tasks based on the completion of previous tasks. This is an arbitrary process, with the skill level of the player being secondary the completion of the task, no matter how long it took or with what relative skill it took to accomplish.

In accordance with the invention player skill level forms the foundation of the presented event, either in the difficulty level of the event or the payout therefor. The player is presented with tasks or event which the player can wager on based on their skill. The invention may thus involve the display of engaging games that players can select from, wager upon, and win money. No longer to players need to choose their own skill, not knowing if the game will be too easy or hard. No longer will they have to play without the ability to wager. With the invention, the player may be presented with a display screen (including but not limited to onsite tablet or smartphone or other interface) with games or other events that are challenging and can provide monetary rewards. Therefore, the player does not need to wonder whether the game will be challenging enough, or too challenging. The invention allows players to choose games with the appropriate difficulty to create a challenging game, and allow them to wager and win money while playing.

At the same time, game developers have a sustainable method of presenting various games which will be engaging to players. In one embodiment, a system of the invention may be used to generate a plurality of different events (based upon player skill level) and present as options to the player those different events, or present a sub-set of such games or events which are most likely to be of interest to the player.

Yet another advantage of embodiment of the invention is that wagering events are presented or played against the house. In the prior art, competitions between players are known. As indicated above, however, this requires two or more players to play against one another to engage in the game. In accordance with the invention, wagering games can be presented to a single player by making the wager against the house. A particular aspect of the invention is a method and system which configures the games so that the wagers are made against the house (e.g. by the house determining event difficulty based and/or payouts for an event having a particular difficulty, whereby the odds of the event are tailored to allowing wagers to be made in a manner which permits payment of winnings for winning outcomes but also rete The invention thus has a wide range of applicability to individuals and businesses, such as players of games like virtual golf, bowling, and other games, including but not limited to video games, and businesses looking to create increased engagement and a new revenue stream through wagering will use this invention to make their games more interesting and profitable.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of presenting a wagering skill-based game to a player, said game having an outcome which is determined primarily by a plurality of skill-inputs of said player relative to at least one event, comprising the steps of:

receiving at a game server, from at least one input device, player identification information;

utilizing said player identification information to determine an identity of said player who is playing said game;

receiving, at said game server, a wager from said player;

relative to each skill-input of said plurality of skill-inputs to said game:

receiving, at said game server, via at least one biometric capture sensor, biometric information captured regarding a participant in said game during play of said game and proximate in time to said each skill-input;

comparing said captured biometric information to stored player identification information regarding said player;

when said comparison does not confirm said participant is said player of said game, invalidating a succeeding skill-input to said game; and when said comparison validates said participant is said player, accepting, at said game server from one or more second sensors, information regarding said validated player's performance in said at least one event based upon said skill-input by said validated player;

determining, via said game server, an outcome of said game based upon said information regarding said validated player's performance comprising said accepted skill-based inputs; and awarding a payout to said validated player when said outcome is a winning outcome.

2. The method in accordance with claim 1, wherein said player identification information comprises login information to an account assigned to said player.

3. The method in accordance with claim 1, wherein said information captured regarding a participant in said game comprises at least one image of a face of said participant.

4. The method in accordance with claim 3, wherein said at least one biometric capture sensor comprises an image capture device.

5. The method in accordance with claim 3, wherein said step of comparing comprises comparing said at least one image of said face to a stored image of said player.

6. The method in accordance with claim 1, wherein said input device comprises at least one of: a player mobile communication device, a kiosk and a gaming device.

7. The method in accordance with claim 1, comprising receiving, at said game server, via said at least one biometric capture sensor, information captured regarding a participant in said game and comparing each captured information to said stored player identification information before each skill-input of said player.

8. The method in accordance with claim 1, further comprising:

determining, at said game server, a player skill level assigned to player;

determining, at said game server, a difficultly level for said at least one event;

determining, at said game server, odds of said player achieving a successful outcome of said at least one event based upon said difficultly of said at least one event and said player skill level;

determining, at said game server, said payout for said winning outcome of said game based upon said odds and an amount of said wager.

9. The method in accordance with claim 1 wherein said one or more second sensors are selected from the group consisting of: an RFID sensor, a GPS, a radar, a LIDAR, and an image capture device.

* * * * *